(12) United States Patent
Shirai

(10) Patent No.: US 8,177,251 B2
(45) Date of Patent: May 15, 2012

(54) BICYCLE SEATPOST ASSEMBLY

(75) Inventor: Toyoto Shirai, Osaka (JP)

(73) Assignee: Shimano Inc., Osaka (JP)

( * ) Notice: Subject to any disclaimer, the term of this patent is extended or adjusted under 35 U.S.C. 154(b) by 294 days.

(21) Appl. No.: 12/554,092

(22) Filed: Sep. 4, 2009

(65) Prior Publication Data

US 2011/0057485 A1 Mar. 10, 2011

(51) Int. Cl.
*B62J 9/00* (2006.01)
*B62J 1/00* (2006.01)

(52) U.S. Cl. ............................... 280/288.4; 297/215.13

(58) Field of Classification Search ............ 297/195.1, 297/215.13, 338, 339, 463.1; 280/287, 490.1, 280/491.2, 288.4; 248/125.8, 404, 157, 161, 248/188.5
See application file for complete search history.

(56) References Cited

U.S. PATENT DOCUMENTS

| 5,115,723 | A * | 5/1992 | Wang | 92/5 R |
| 7,083,180 | B2 * | 8/2006 | Turner | 280/287 |
| 2009/0108642 | A1 * | 4/2009 | Hsu | 297/195.1 |
| 2010/0187055 | A1 * | 7/2010 | Becker et al. | 188/275 |
| 2011/0187166 | A1 * | 8/2011 | Walsh | 297/215.13 |

FOREIGN PATENT DOCUMENTS

JP 2003-081150 A 3/2003

* cited by examiner

*Primary Examiner* — Milton Nelson, Jr.
(74) *Attorney, Agent, or Firm* — Global IP Counselors, LLP

(57) ABSTRACT

A bicycle seatpost assembly is provided with a pair of telescopically tubes, a floating piston, a valve unit and a flow control part. One end of the second tube is open such that one end of the first tube is telescopically disposed in the second tube. The floating piston forms a gas chamber in a first tube. The valve unit is immovably disposed with respect to a second tube and divides the first tube into first and second fluid chambers. The flow control part moves relative to the valve unit such that fluid flows from the second fluid chamber to the first fluid chamber through the valve unit when the flow control part is in a first position, and such that fluid flows from the first fluid chamber to the second fluid chamber through the valve unit when the flow control part is in a second position.

24 Claims, 29 Drawing Sheets

BICYCLE SEATPOST ASSEMBLY

BACKGROUND OF THE INVENTION

1. Field of the Invention

This invention generally relates to a seatpost that is adjustable to adjust the seat height of a bicycle seat. More specifically, the present invention relates to a bicycle seatpost assembly to adjust the seat height of a bicycle seat with respect to a bicycle frame by controlling fluid flow between at least two chambers.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

A bicycle seat is normally supported on a bicycle frame by a seatpost that is telescopically disposed in the seat tube of the bicycle frame. The bicycle seat typically has a pair of parallel rails extending along the bottom of the seat. The rails of the bicycle seat are attached to the seatpost by a clamp at the top of the seatpost. The height of the bicycle seat with respect to the bicycle frame is typically adjusted by changing the insertion amount of the seatpost in the seat tube of the bicycle frame. The upper end of the seat tube is typically provided with a longitudinal slit and a clamping arrangement that adjusts the diameter of the upper end of the seat tube to squeeze the seatpost for securing the seatpost in the desired position with respect to the bicycle frame. Recently, seatpost assemblies have been proposed that are hydraulically operated in order to adjust the height of the seat. One example of a hydraulically operated seatpost assembly is disclosed in U.S. Pat. No. 7,083,180.

In view of the above, it will be apparent to those skilled in the art from this disclosure that there exists a need for an improved bicycle seatpost that is adjustable in height. This invention addresses this need in the art as well as other needs, which will become apparent to those skilled in the art from this disclosure.

SUMMARY OF THE INVENTION

One object of the present invention is to provide a bicycle seatpost assembly that is easily adjustable in height with respect to the bicycle frame and simply to install in a seat tube of a bicycle frame.

The foregoing objects can basically be attained by providing a bicycle seatpost assembly that mainly comprises a first tube, a second tube, a floating piston, a valve unit and a flow control part. The first tube has a first end and a second end. The second tube has a first end and a second end. The first end of the second tube is open such that the second end of the first tube is telescopically disposed in the first end of the second tube. The floating piston is disposed in an interior bore of the first tube and forms a gas chamber disposed between the floating piston and the first end of the first tube. The valve unit is immovably disposed with respect to the second tube and divides the interior bore of the first tube into a first fluid chamber and a second fluid chamber. The first fluid chamber is disposed between the valve unit and the floating piston. The second fluid chamber is disposed between the valve unit and the second end of the first tube. The valve unit includes a first check valve and a second check valve. The first check valve is arranged to block fluid flow from the first fluid chamber to the second fluid chamber and permit fluid flow from the second fluid chamber to the first fluid chamber. The second check valve is arranged to block fluid flow from the second fluid chamber to the first fluid chamber and permit fluid flow from the first fluid chamber to the second fluid chamber. The flow control part is movably arranged to with respect to the first and second check valves such that fluid flows from the second fluid chamber to the first fluid chamber through the first check valve when the flow control part is in a first position, and such that fluid flows from the first fluid chamber to the second fluid chamber through the second check valve when the flow control part is in a second position.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
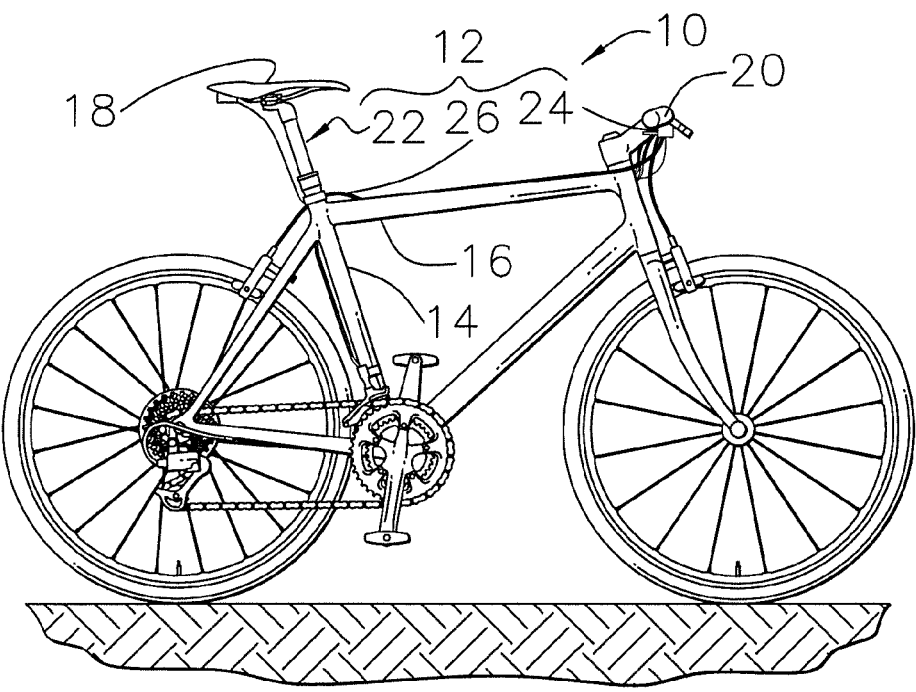
FIG. 1 is a side elevational view of a bicycle in which a bicycle seatpost assembly is employed in accordance with a first embodiment.
Figure 2:
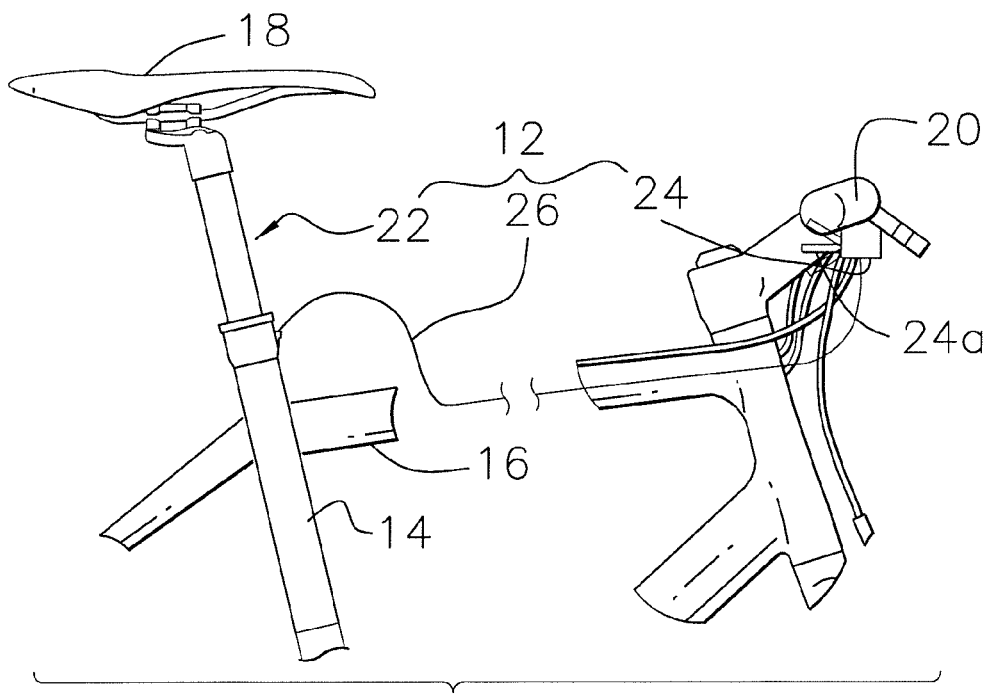
FIG. 2 is a partial side elevational view of the bicycle illustrated in FIG. 1 that is equipped with the bicycle seatpost assembly in the high or top seatpost position.
Figure 3:
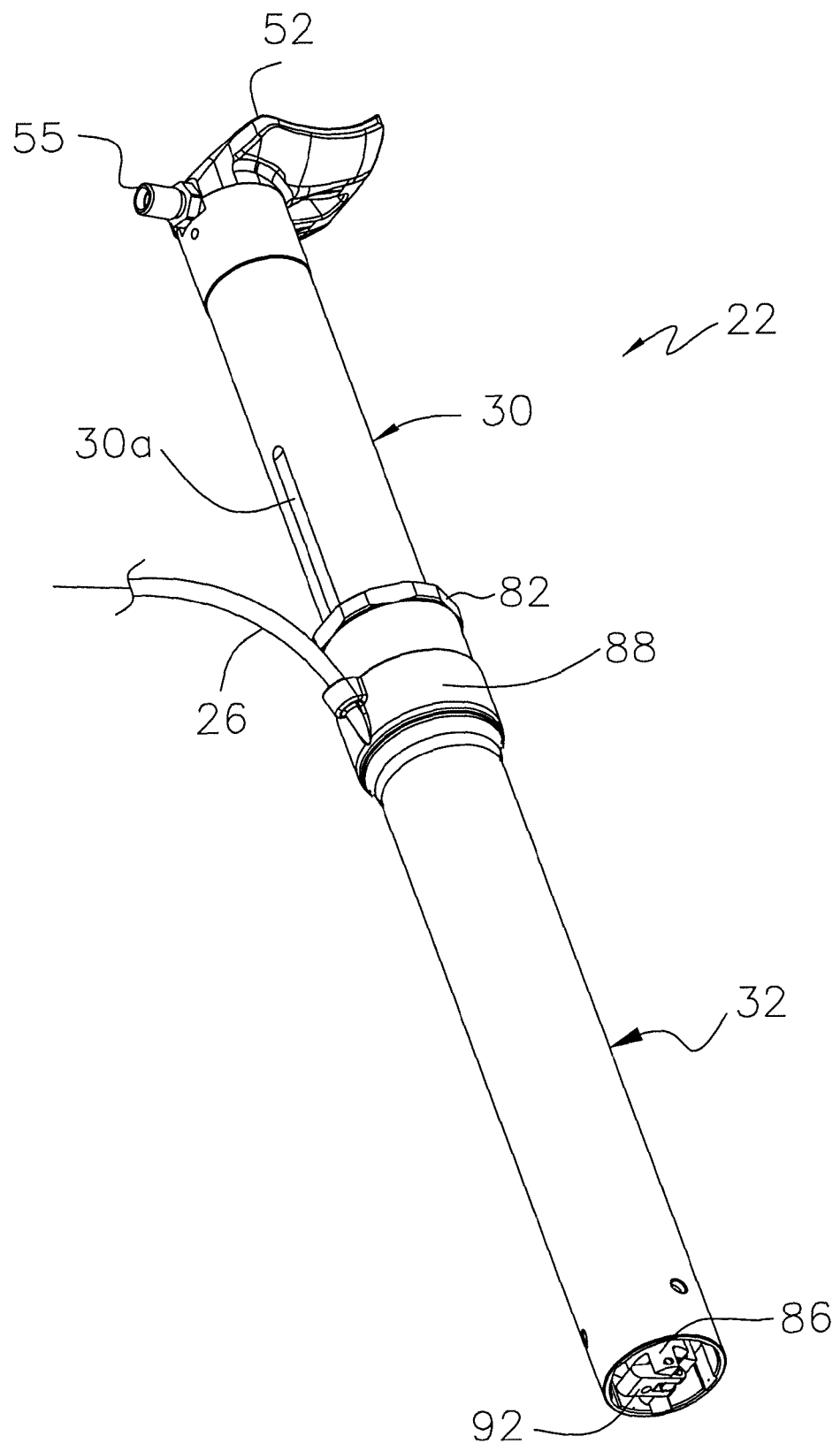
FIG. 3 is a perspective view of the bicycle seatpost assembly illustrated in FIGS. 1 and 2 with the bicycle seatpost assembly in the high or top seatpost position.
Figure 4:
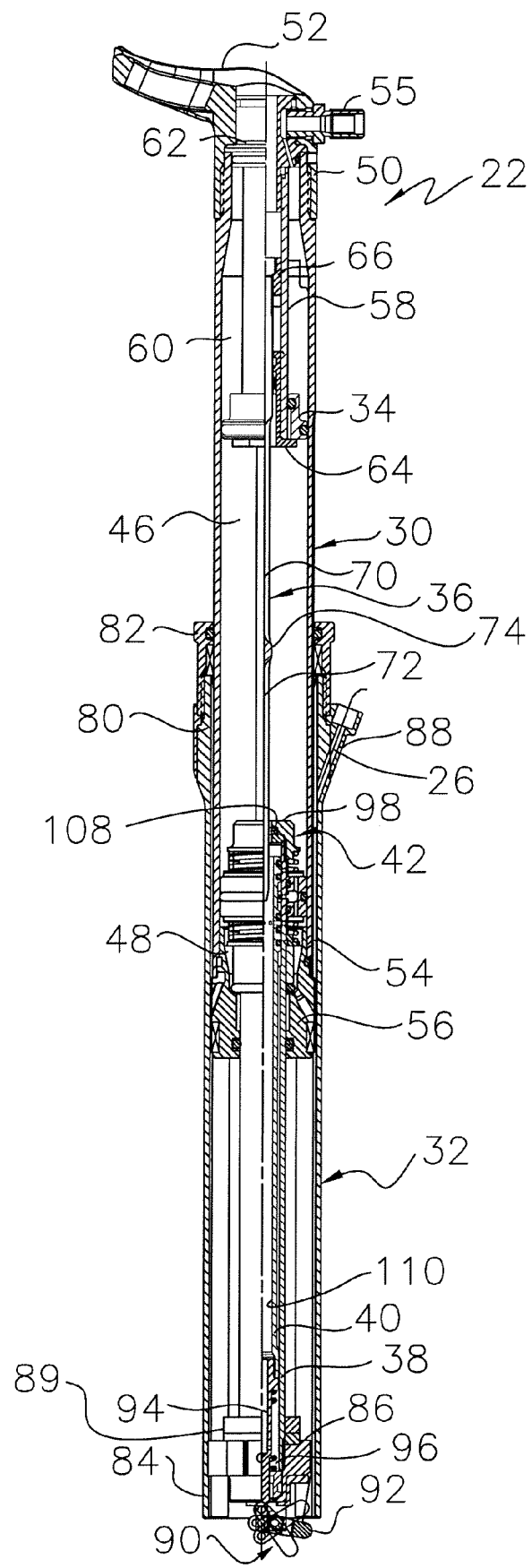
FIG. 4 is a longitudinal cross sectional view of the bicycle seatpost assembly illustrated in FIGS. 1 to 3, with half of selected internal parts shown in elevation.

Referring initially to FIGS. 1 and 2, a bicycle 10 is illustrated with a seatpost assembly 12 in accordance with a first embodiment. The bicycle seatpost assembly 12 is mounted to a seat tube 14 of a bicycle frame 16. The bicycle seatpost assembly 12 adjusts a seat height of a bicycle seat 18 with respect to the bicycle frame 16. Basically, the bicycle seatpost assembly 12 includes a telescoping seatpost 22, an operating device 24 and a movement transmission element 26 that operatively couples the operating device 24 to the telescoping seatpost 22 for adjusting the height of the telescoping seatpost 22. In this embodiment, the length of the telescoping seatpost 22 is adjustable to three preset seatpost positions, e.g., a high preset seatpost position, a middle preset seatpost position and a low preset seatpost position. The high seatpost position is a riding position for when the bicycle 10 runs in the flat road or uphill. The middle position is a riding position for when the bicycle 10 runs in the slightly rapid downhill. The low position is a riding position for when the bicycle 10 runs in the considerably rapid downhill. With the bicycle seatpost assembly 12, the rider can easily change the seatpost position while riding the bicycle 10, i.e., without stopping.

In this illustrated embodiment, the operating device 24 is mounted to the handlebar 20 of the bicycle 10, with the movement transmission element 26 being a wire that is pulled or released by an operation of a lever 24a of the operating device 24. The operating device 24 can be any type of operating device that can carry out the operation of changing the height of the telescoping seatpost 22. Thus, the movement transmission element 26 does not necessary need to be a wire as shown. For example, the movement transmission element 26 could be a fluid if needed and/or desired. However, the movement transmission element 26 is preferably a wire in order to minimize costs and weight.

Referring now to FIGS. 3 to 15, the telescoping seatpost 22 is a separate unit from the bicycle frame 16 such that it can be easily installed into the seat tube 14 in place of a conventional non-adjustable seatpost. Basically, the telescoping seatpost 22 includes an inner (first) tube 30, an outer (second) tube 32, a floating piston 34, a rod 36, a guide member 38, a flow control part 40 and a valve unit 42. The valve unit 42 divides the interior bore of the inner tube 30 into a first or upper fluid chamber 46 and a second or lower fluid chamber 48. As mentioned above, the height of the telescoping seatpost 22 is adjustable to three preset seatpost positions. In particular, the inner and outer tubes 30 and 32 are telescopically arranged, with the amount of insertion of the inner tube 30 into the outer tube 32 being adjustable. The outer tube 32 is secured to the seat tube 14 by a conventional clamping arrangement (not shown) provided on the upper end of the seat tube 14. In particular, the upper end of the seat tube 14 is provided with a longitudinal slit such that the clamping arrangement adjusts the diameter of the upper end of the seat tube to squeeze the outer tube 32.

The inner tube 30 is provided with a longitudinal slot 30a (FIG. 3) that receives a key (not shown) for preventing relative rotation between the inner and outer tubes 30 and 32. The lower end of the slot 30a forms a channel between the inner and outer tubes 30 and 32 for receiving the movement transmission element 26. The inner tube 30 has a first end 50 with a seat mounting member 52 fixed (threaded) thereto and a second end 54 with a guide block 56 fixed (threaded) thereto. The seat mounting member 52 includes an air filler valve port 55 for receiving pressurized air or other gaseous fluid. The air filler valve port 55 includes an air filler valve (not shown), which is a one-way valve for filling the upper end of the inner tube 30 with compressed air. The seat mounting member 52 seals off the first end 50 of the inner tube 30, while the guide block 56 seals of the second end 54 of the inner tube 30. The guide block 56 is slidably supported on the guide member 38 in an air tight manner. Thus, the guide block 56 acts as a bottom plug of the second end 54 of the inner tube 30. Also the guide block 56 acts as an abutment for limiting downward movement of the inner tube 30 with respect to the outer tube 32. While the guide block 56 extends out of the second end 54 of the inner tube 30, alternatively, it is also feasible to recess the guide block 56 from the second end 54 of the inner tube 30 and provide a separate abutment arrangement for limiting downward movement of the inner tube 30 with respect to the outer tube 32.

Figure 9:
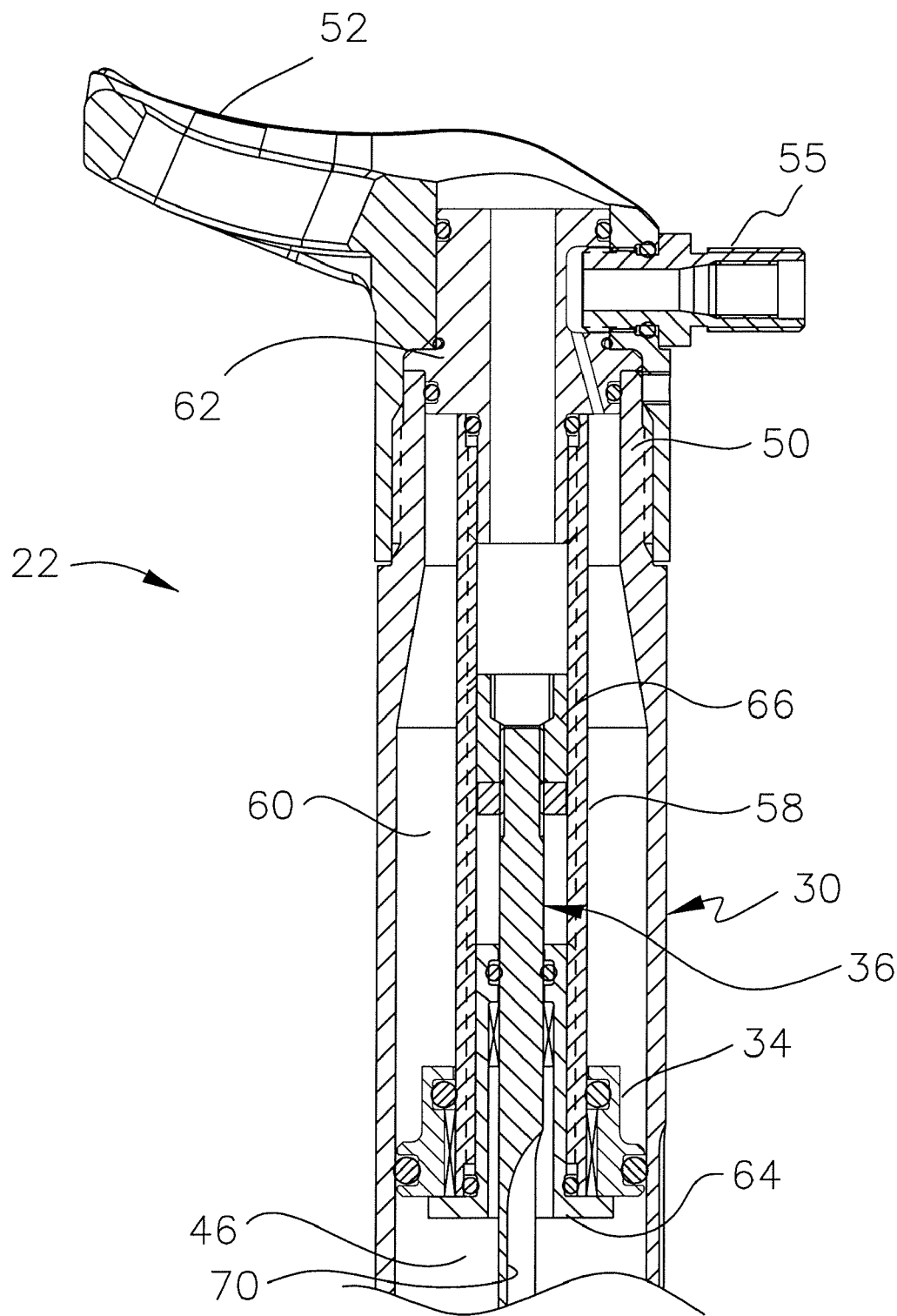
FIG. 9 is an enlarged, longitudinal cross sectional view of a top portion of the bicycle seatpost assembly illustrated in FIG. 5, with the bicycle seatpost assembly in the high or top seatpost position.
Figure 12:
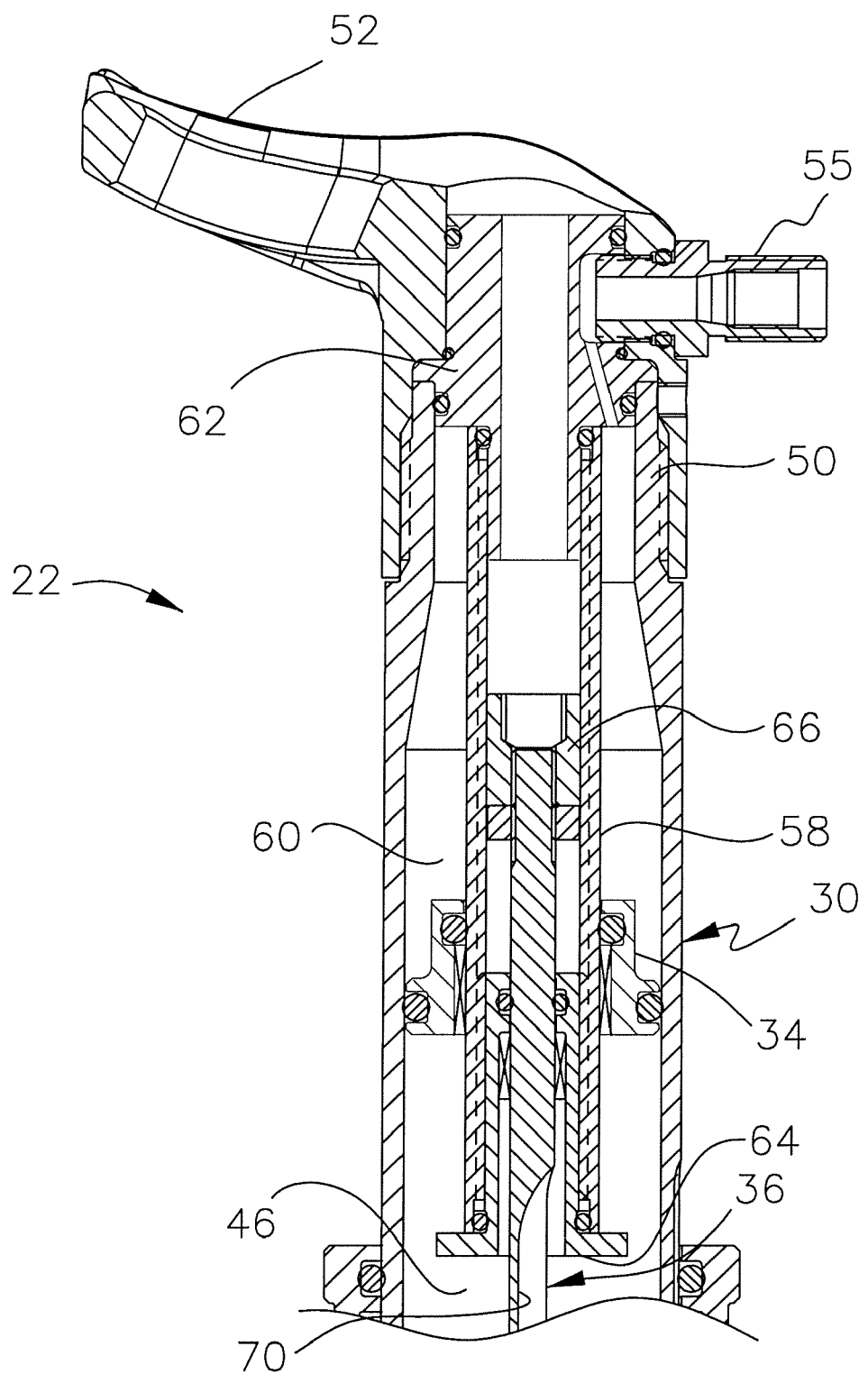
FIG. 12 is an enlarged, longitudinal cross sectional view of a top portion of the bicycle seatpost assembly illustrated in FIG. 6, with the floating piston in the position for attaining the middle seatpost position of the bicycle seatpost assembly.
Figure 14:
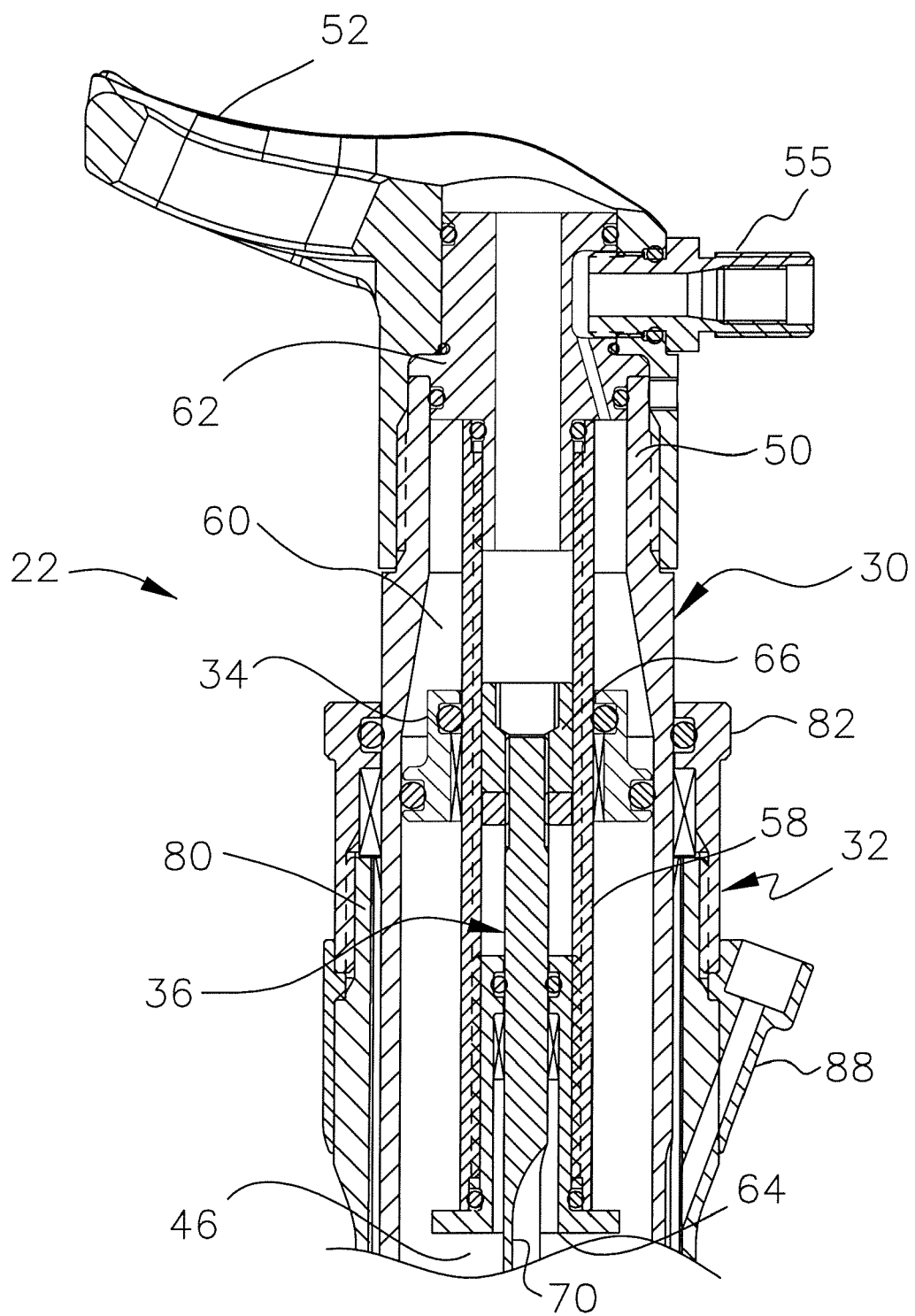
FIG. 14 is an enlarged, longitudinal cross sectional view of a top portion of the bicycle seatpost assembly illustrated in FIG. 7, with the floating piston in the position for attaining the low or bottom seatpost position of the bicycle seatpost assembly.

The first end 50 of the inner tube 30 also includes an axially extending shaft 58, with the floating piston 34 slidably mounted on the shaft 58 to move in an axial direction of the inner tube 30. Thus, the floating piston 34 is disposed in the interior bore of the inner tube 30 and forms a gas chamber 60 disposed between the floating piston 34 and the first end 50 of the inner tube 30. The axial position of the floating piston 34 changes as the seatpost position of the telescoping seatpost 22 changes. Specifically, the axial position of the floating piston 34 moves to its lowermost position when the telescoping seatpost 22 is in the high seatpost position as seen in FIG. 9. The axial position of the floating piston 34 moves to a middle position when the telescoping seatpost 22 is in the middle seatpost position as seen in FIG. 12. The axial position of the floating piston 34 moves to its uppermost position when the telescoping seatpost 22 is in the low seatpost position as seen in FIG. 14. Thus, the air or gas in the gas chamber 60 becomes more compressed as seatpost position of the telescoping seatpost 22 becomes lower with respect to the preceding seatpost position. The compressed air or gas in the gas chamber 60 provides a driving force for extending the inner tube 30 with respect to the outer tube 32 when the seatpost position of the telescoping seatpost 22 is changed from a lower position to a higher position.

As seen in FIGS. 4 to 7, the valve unit 42 is immovably disposed with respect to the outer tube 32, and divides the interior bore of the inner tube 30 into the first fluid chamber 46 and the second fluid chamber 48 as mentioned above. The first fluid chamber 46 is disposed between the valve unit 42 and the floating piston 34. The second fluid chamber 48 is disposed between the valve unit 42 and the second end 54 of the inner tube 30. The flow control part 40 cooperates with the guide member 38 and the valve unit 42 to control the flow of fluid between the first and second fluid chambers 46 and 48 to change the height of the telescoping seatpost 22 as explained below.

The shaft 58 is a hollow tubular member that adjustably supports the rod 36 within its interior passageway. In particular, the upper end of the shaft 58 has an annular flange 62 that is sandwiched between the first end 50 of the inner tube 30 and the seat mounting member 52. The lower end of the shaft 58 has a stopper member 64 threaded into the lower end of the shaft 58. The stopper member 64 is flanged at its lower end to act as a stop for the floating piston 34 to limit downward movement of the floating piston 34 within the inner tube 30. The upper end of the stopper member 64 act as a stop for the rod 36 to limit downward movement of the floating piston 34 within the hollow interior of the shaft 58.

Figure 11:
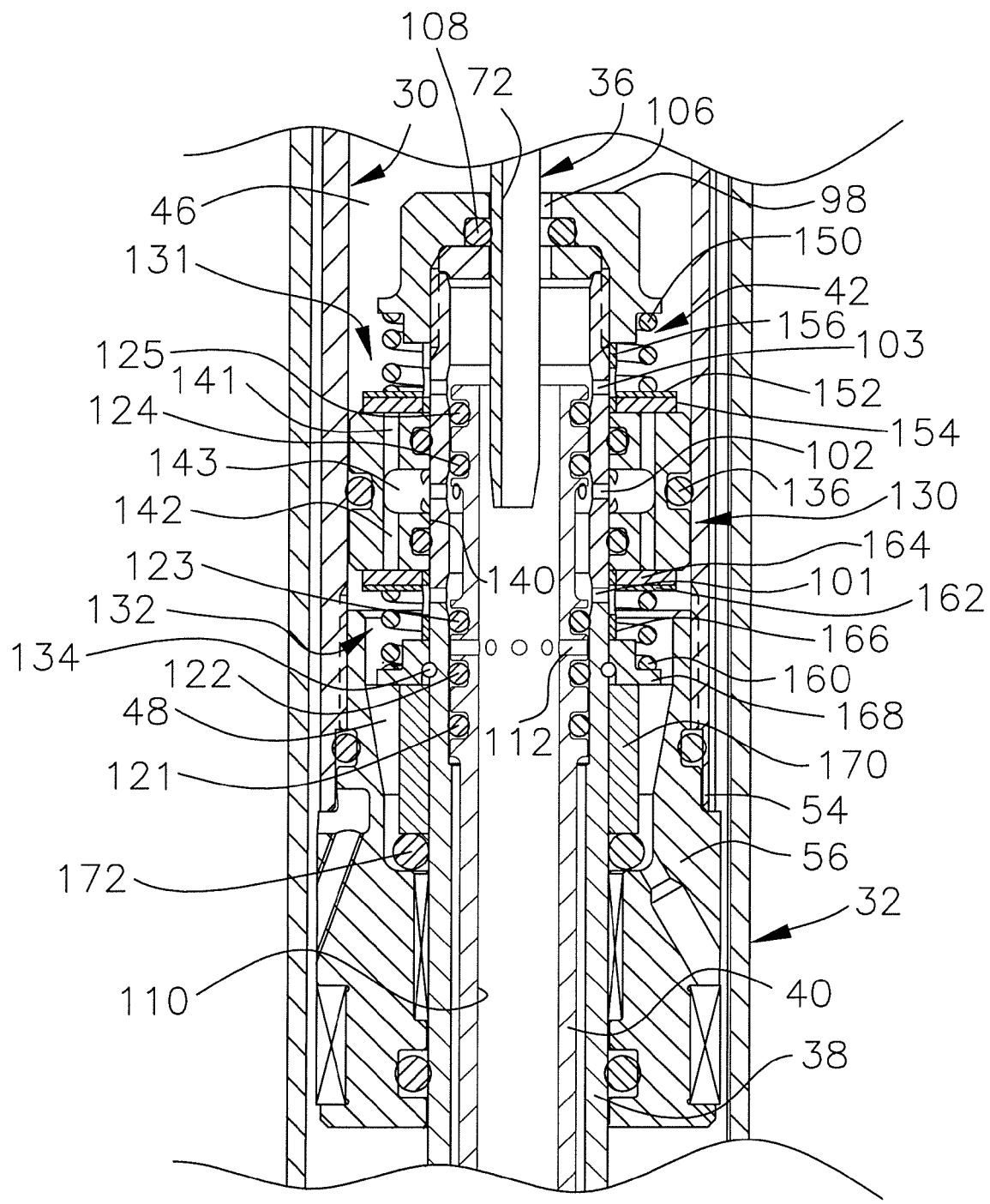
FIG. 11 is an enlarged, longitudinal cross sectional view of a middle portion of the bicycle seatpost assembly illustrated in FIG. 5, with the flow control part in the first control position for attaining the high or top seatpost position of the bicycle seatpost assembly.
Figure 13:
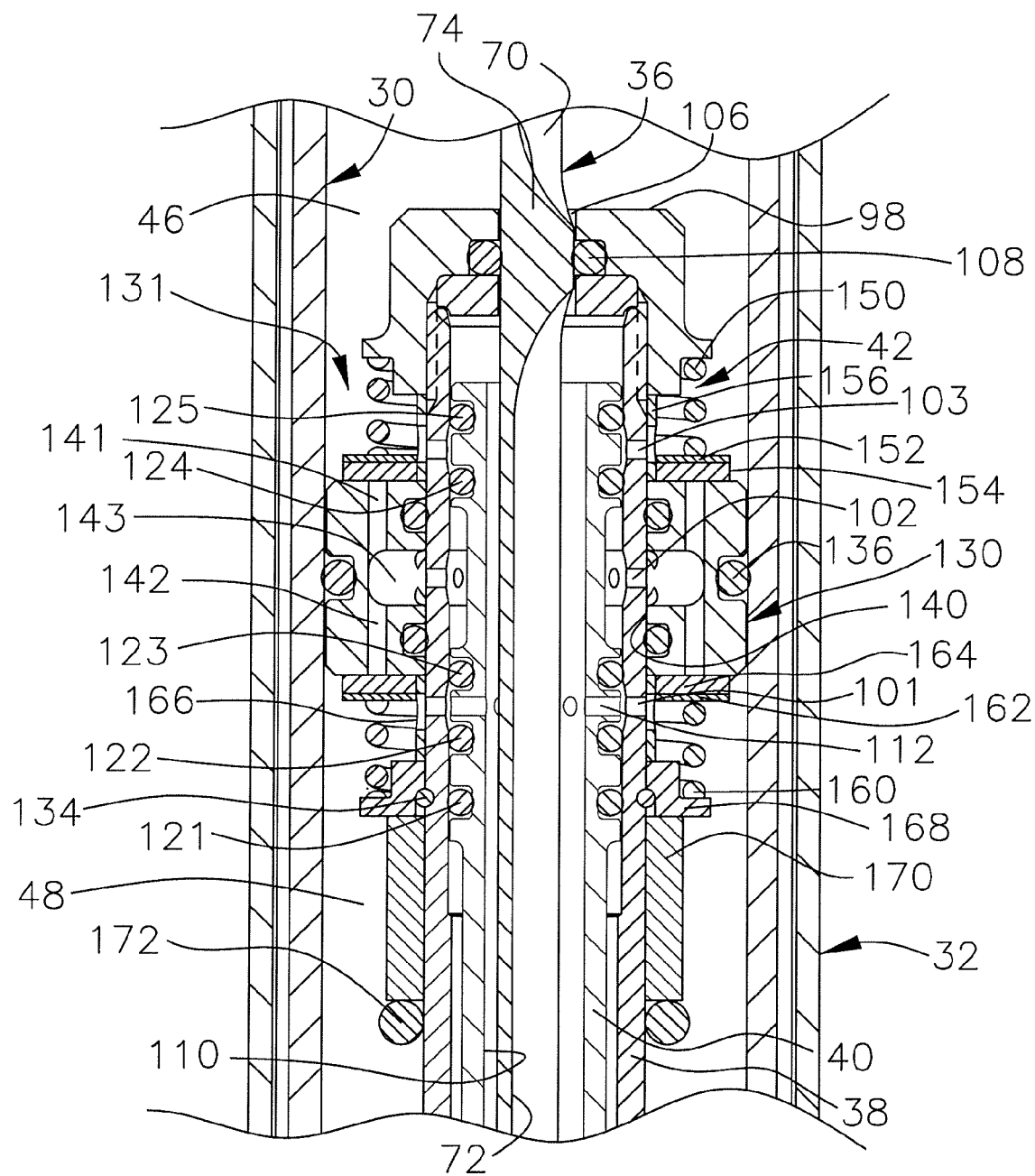
FIG. 13 is an enlarged, longitudinal cross sectional view of a middle portion of the bicycle seatpost assembly illustrated in FIG. 6, with the flow control part in the first control position for attaining the middle seatpost position of the bicycle seatpost assembly.
Figure 15:
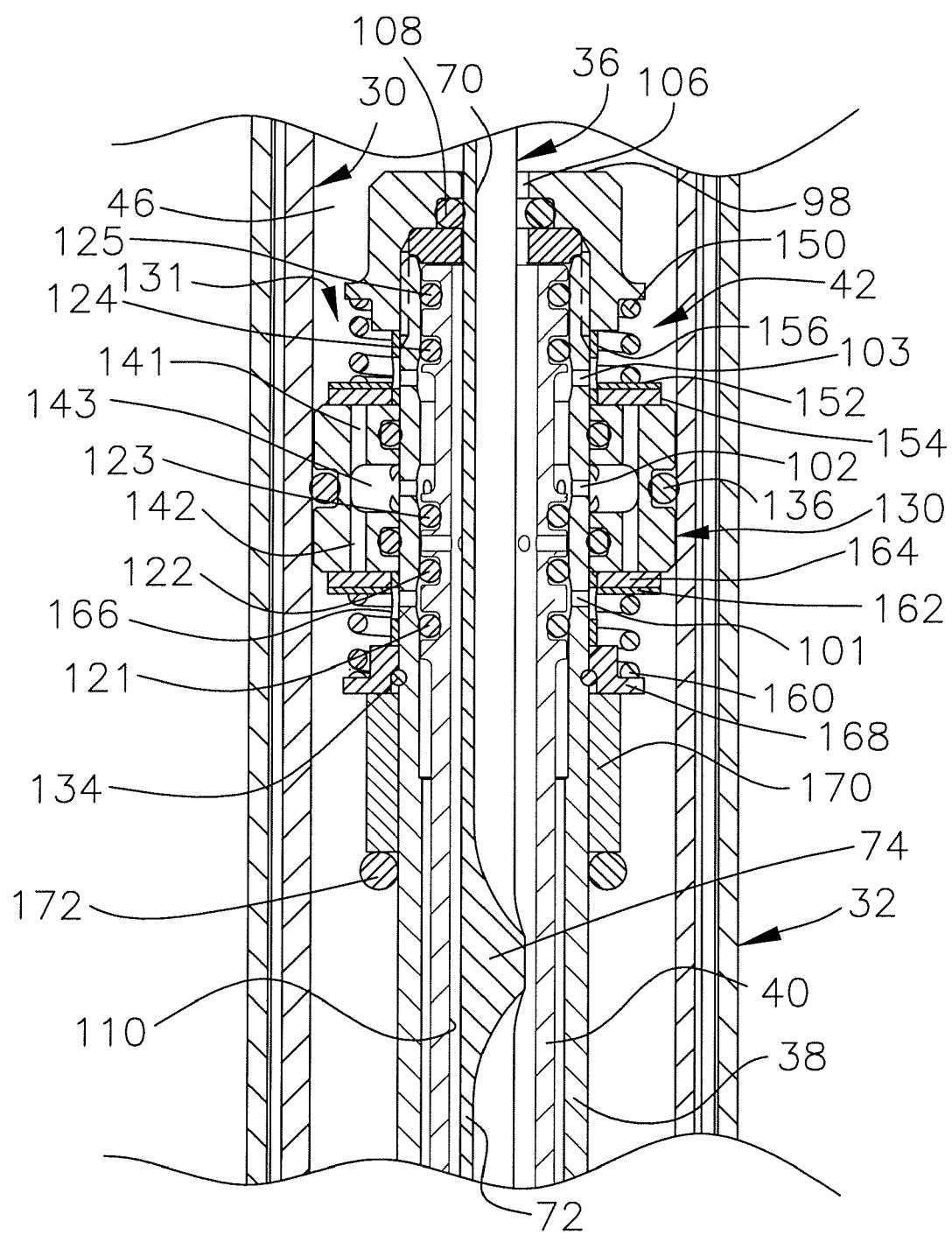
FIG. 15 is an enlarged, longitudinal cross sectional view of a middle portion of the bicycle seatpost assembly illustrated in FIG. 7, with the flow control part in the first control position for attaining the low or bottom seatpost position of the bicycle seatpost assembly.

As seen in FIGS. 9, 12 and 14, the illustrated embodiment, the rod 36 has an adjustment nut 66 threaded onto its upper end. The adjustment nut 66 is threadedly engages the internal thread of the shaft 58 to hold the rod 36 in the desired location in an axially adjustable manner. As seen in FIGS. 11, 13 and 15, the illustrated embodiment, the lower end of the rod 36 is movably (slidably) disposed with respect to the valve unit 42. The rod 36 has an upper longitudinally extending flute 70 and a lower longitudinally extending flute 72 with a blocking portion 74 dividing the flutes 70 and 72. The blocking portion 74 selectively blocks fluid flowing longitudinally through the center of the valve unit 42 as discussed below.

The outer tube 32 has a first end 80 with an outer attachment ring 82 fixed (threaded) thereto and a second end 84 with a bottom support part 86 fixed thereto via a bayonet type mount. The first end 80 the outer tube 32 is open such that the second end 54 of the inner tube 30 is telescopically disposed in the first end 80 of the outer tube 32. The outer attachment ring 82 retains an outer cable guide 88 on the external surface of outer tube 32. The outer cable guide 88 guides the movement transmission element 26 through an opening in the side of the outer tube 32. The bottom support part 86 movably supports an actuating device 90 that moves the flow control part 40 in response to movement of the lever 24a of the operating device 24. The upper surface of the bottom support part 86 acts as a stopper for limiting downward movement of the inner tube 30 with respect to the outer tube 32. In particular, the guide block 56 contacts the upper surface of the bottom support part 86 for limiting downward movement of the inner tube 30 with respect to the outer tube 32. Preferably, the upper surface of the bottom support part 86 includes at least one rubber cushioning element 89.

Figure 5:
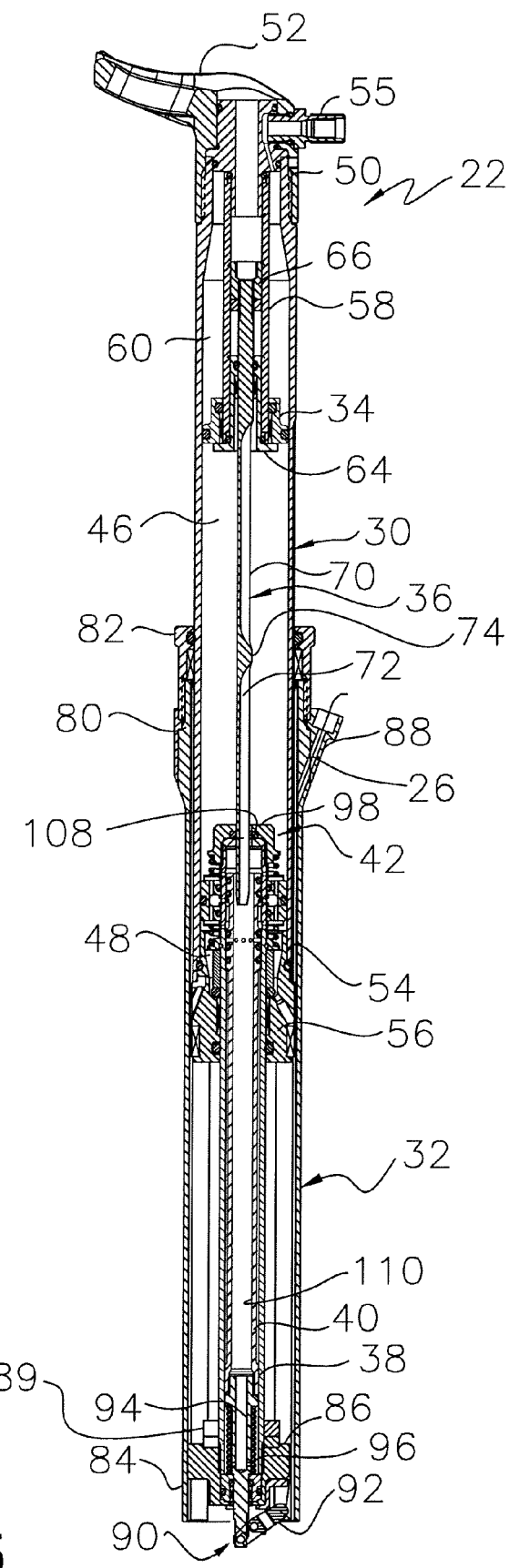
FIG. 5 is a longitudinal cross sectional view of the bicycle seatpost assembly illustrated in FIGS. 1 to 4, with the bicycle seatpost assembly in the high or top seatpost position.
Figure 6:
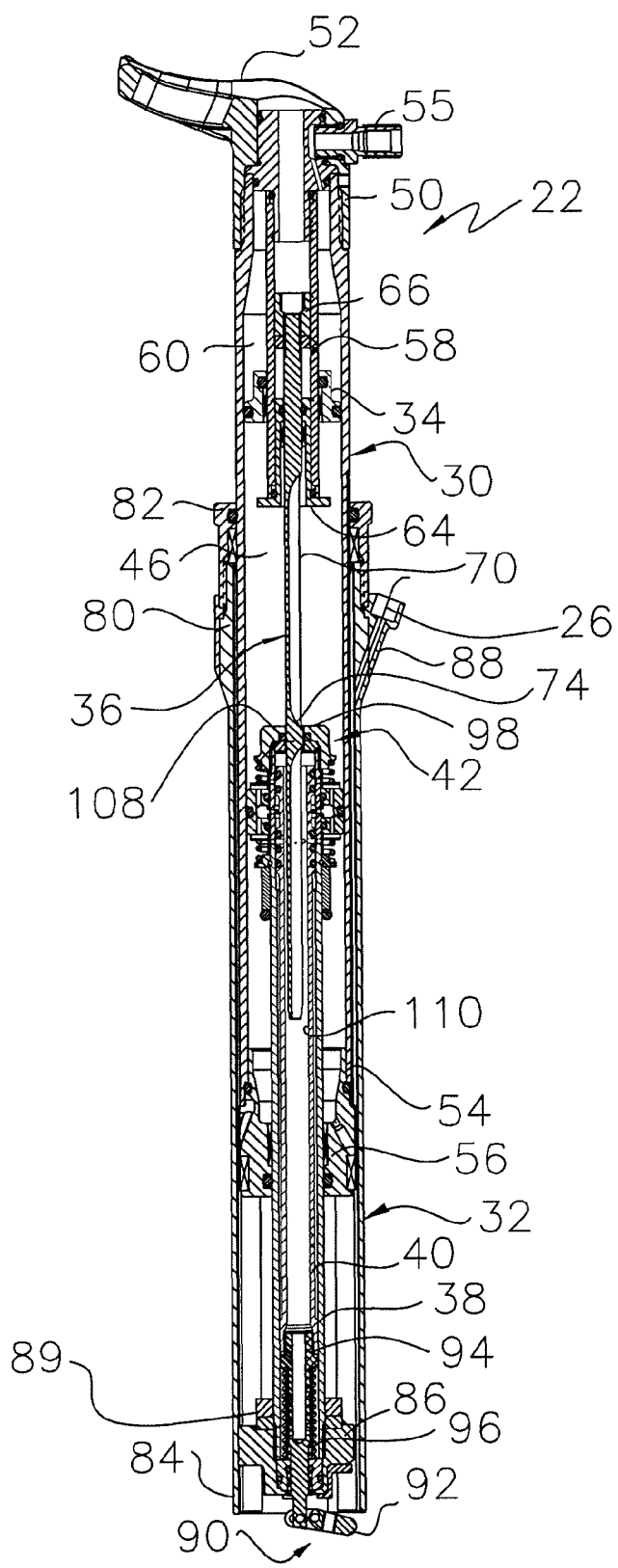
FIG. 6 is a longitudinal cross sectional view of the bicycle seatpost assembly illustrated in FIGS. 1 to 5, with the bicycle seatpost assembly in the middle seatpost position.
Figure 7:
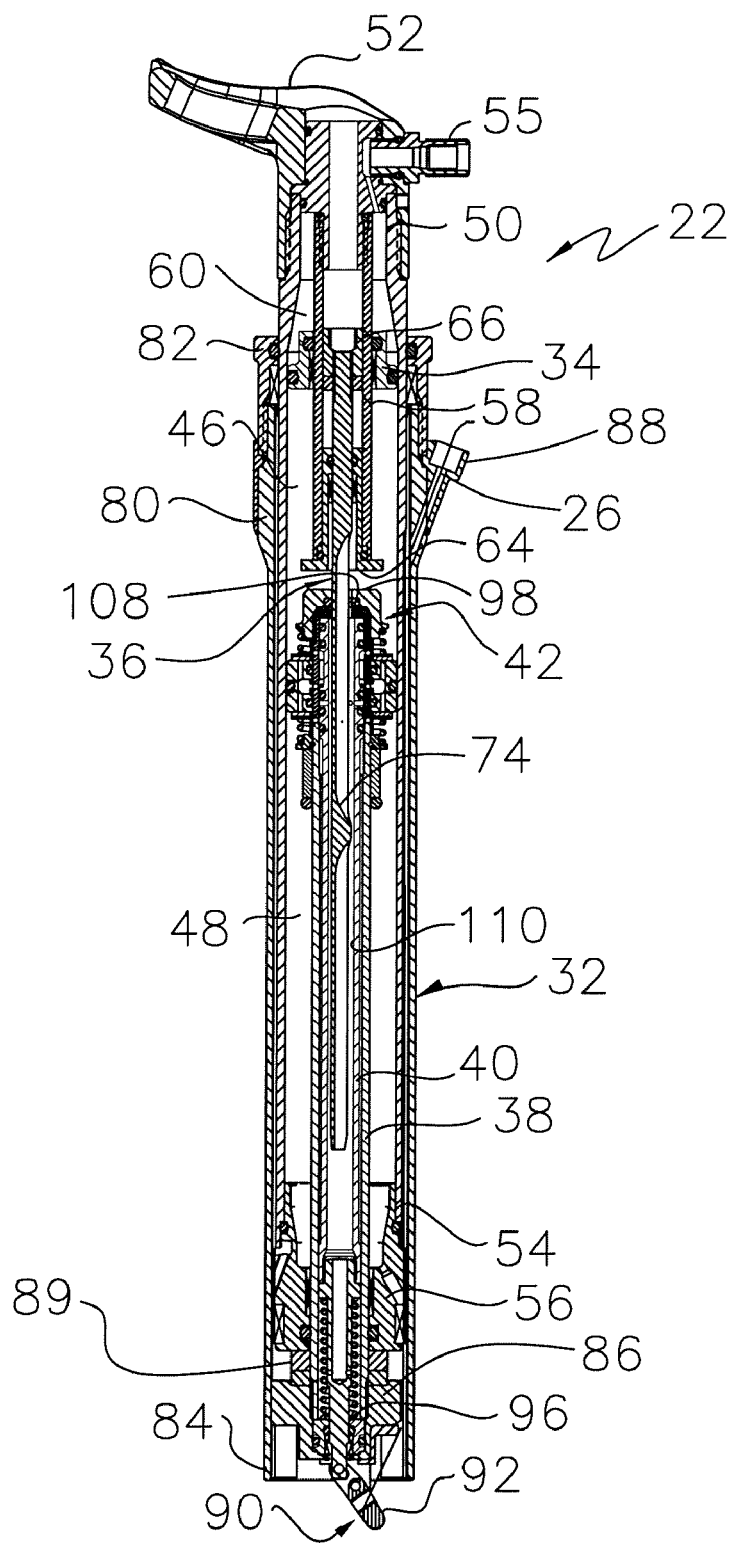
FIG. 7 is a longitudinal cross sectional view of the bicycle seatpost assembly illustrated in FIGS. 1 to 6, with the bicycle seatpost assembly in the low or bottom seatpost position.
Figure 8:
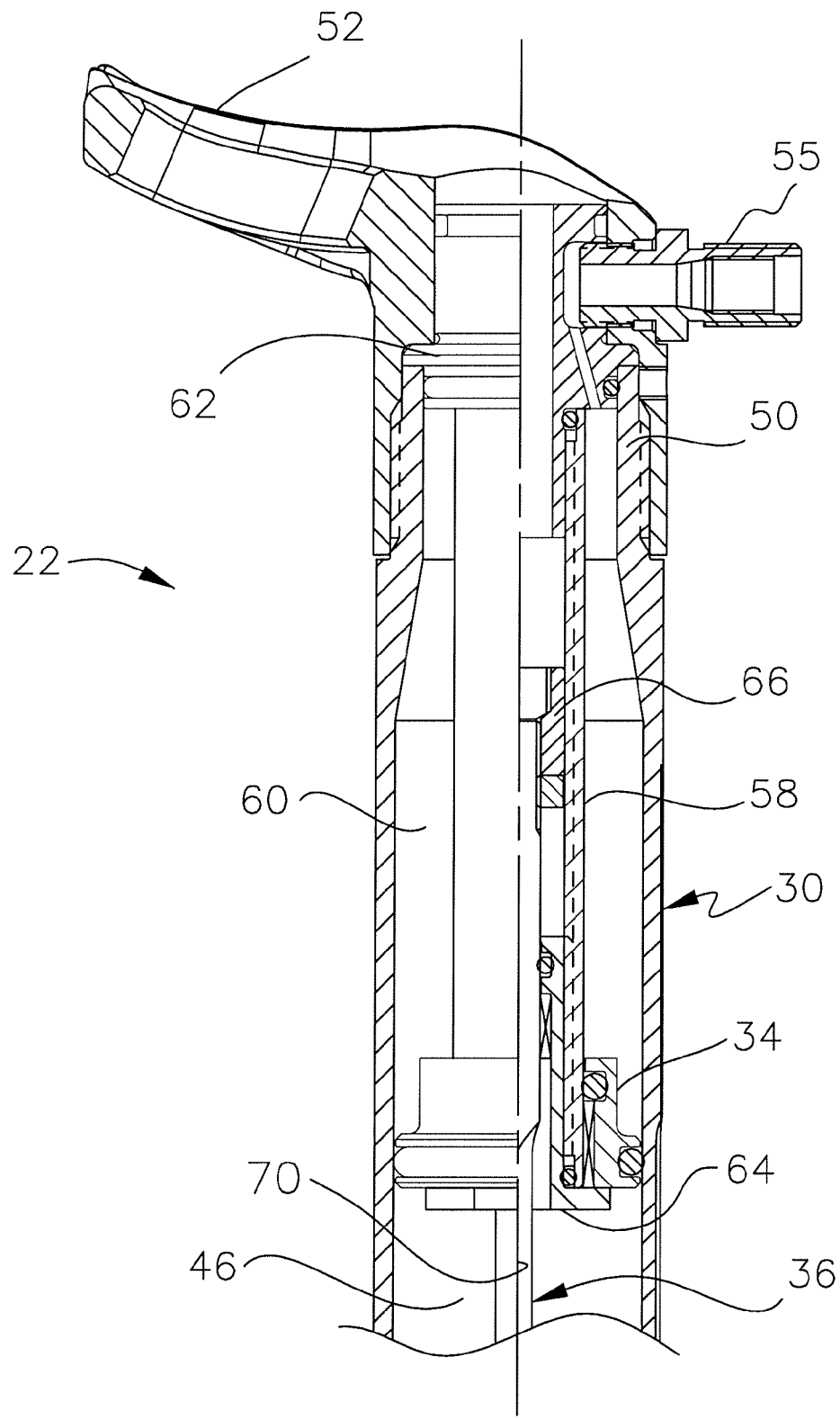
FIG. 8 is an enlarged, longitudinal cross sectional view of a top portion of the bicycle seatpost assembly illustrated in FIG. 5, with the bicycle seatpost assembly in the high or top seatpost position and half of selected internal parts shown in elevation.

As best seen in FIGS. 5 and 6, basically, the actuating device 90 is movably mounted to the second end 84 of the outer tube 32. The actuating device 90 is operatively coupled to the flow control part 40 to selectively move the flow control part 40 in the axial direction of the outer tube 32. The operating device 24 is operatively coupled to the actuating device 90 by the movement transmission element 26 to selectively move the actuating device 90 and thus move the flow control part 40 to selectively change the height of the telescoping seatpost 22 as explained below.

The actuating device 90 includes a lever 92, a pull rod 94 and a coil compression spring 96. The bottom support part 86 includes a mount portion that pivotally supports the lever 92. The lever 92 has one end of the movement transmission element 26 secured to one end of the lever 92 and the pull rod 94 pivotally secured to the other end of the lever 92 with respect to the pivot axis of the lever 92. Thus, pulling and releasing the movement transmission element 26 by moving the lever 24a of the operating device 24 causes the lever 92 of the actuating device 90 to rock about its pivot axis which in turn moves the pull rod 94 within the guide member 38. The coil compression spring 96 is mounted around the pull rod 94, and applies a biasing force on the pull rod 94 in an upward direction.

Figure 10:
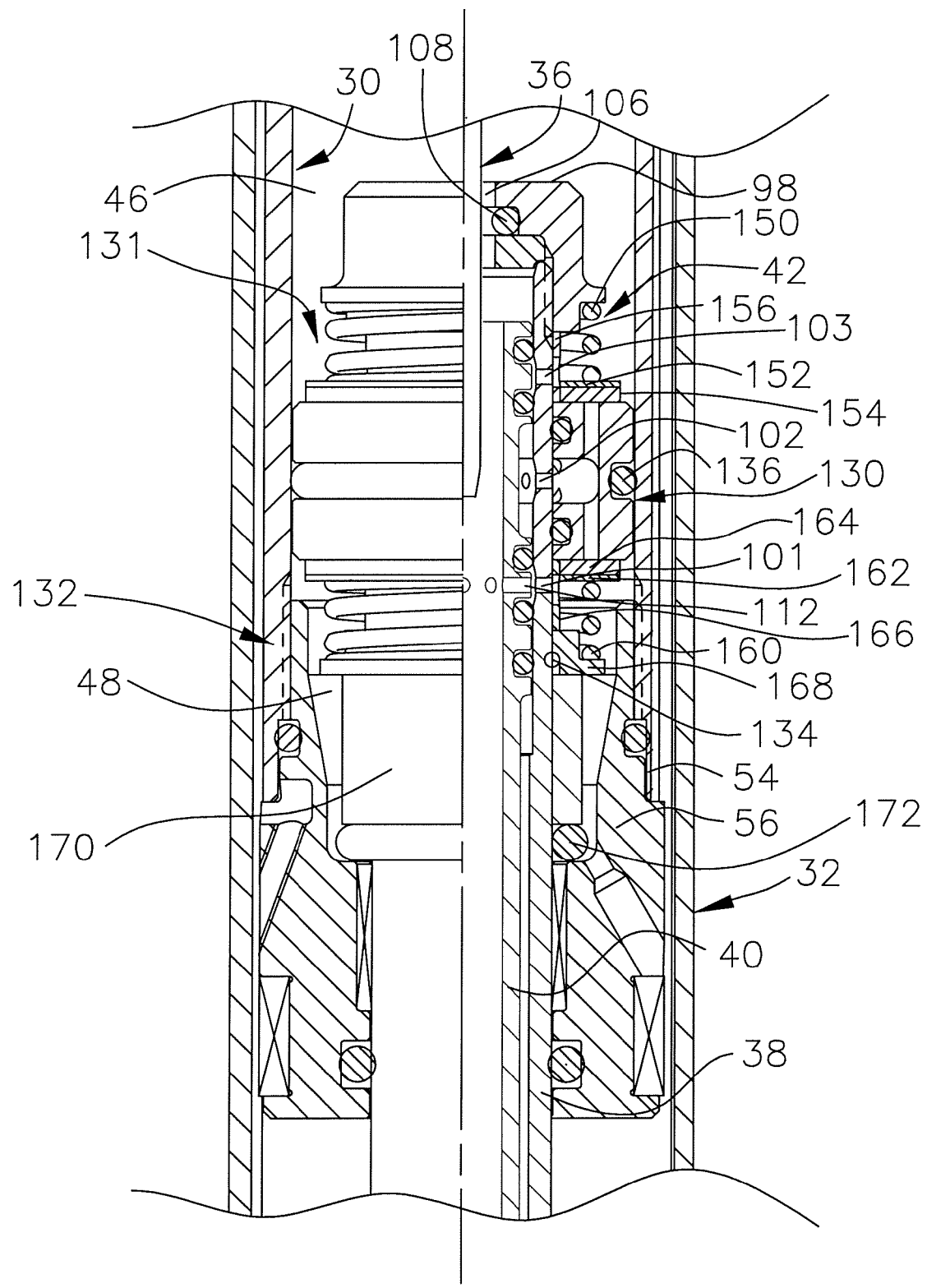
FIG. 10 is an enlarged, longitudinal cross sectional view of a middle portion of the bicycle seatpost assembly illustrated in FIG. 5, with half of selected internal parts shown in elevation.

The lower end of the guide member 38 is fixed (threaded) in a center threaded bore of the bottom support part 86 such that the guide member 38 is coaxially mounted within the outer tube 32. Thus, the guide member 38 is rigidly fixed to the outer tube 32 via the bottom support part 86. A piston nut 98 of the valve unit 42 is threaded on the upper end of the guide member 38 to secure the valve unit 42 to the outer tube 32 via the guide member 38 and the bottom support part 86. The upper end of the guide member 38 is also provided with three sets of radially extending openings 101, 102 and 103. As seen in FIGS. 10 and 11, the first radially extending openings 101 are disposed at a first axial position of the guide member 38 from the bottom support part 86. The second radially extending orifices or openings 102 are disposed at a second axial position of the guide member 38 from the bottom support part 86. The third radially extending orifices or openings 103 are disposed at a third axial position of the guide member 38 from the bottom support part 86. The second radially extending openings 102 are disposed axially between the first and third openings 101 and 103, respectively.

The piston nut 98 has a center opening or passage 106 that slidably receives the rod 36. This passage 106 constitutes a fluid passage of the valve unit 42. As best seen in FIGS. 6 and 13, a resilient rubber sealing ring 108 is disposed between the piston nut 98 and the upper end of the guide member 38 for selectively engaging the blocking portion 74 of the rod 36 to selectively block and open the passage 106 of the valve unit 42. In other words, the rod 36 is slidably disposed with respect to the valve unit 42 to selectively block and open the passage 106 of the valve unit 42 such that fluid flow between the first and second fluid chambers 46 and 48 is blocked to attain the middle seatpost position (FIG. 6) between the high and low seatpost positions.

Turning now to the flow control part 40 a seen in FIGS. 4, 10, 11, 13 and 15. The flow control part 40 is a tubular member with a hollow inner channel 110. The flow control part 40 has its lower end threaded on the upper end of the pull rod 94 within the guide member 38 so that the flow control part 40 and the pull rod 94 move together as a unit inside the guide member 38 in an axial direction of the outer tube 32. Thus, the flow control part 40 moves in the axial direction of the outer tube 32 in response to operation of the lever 24a of the operating device 24. The upper end of the flow control part 40 is provided with a set of radially extending orifices or openings 112 disposed at an axial position that is spaced from the upper end of the flow control part 40 in the downward direction. The orifices or openings 112 fluidly communicate the inner channel 110. In particular, the openings 112 of the flow control part 40 fluidly communicates the inner channel 110 with the second fluid chamber 48 when the flow control part 40 is in the third control position by the rod 36 blocking the passage 106 of the valve unit 42 to block fluid flow between the first and second fluid chambers 46 and 48.

The upper end of the flow control part 40 is also provided with five axially spaced apart O-rings or annular sealing members 121, 122, 123, 124 and 125. The sealing members 121, 122, 123, 124 and 125 contact the interior of the guide member 38 isolate the interface between the guide member 38 and the flow control part 40 into several separate areas for controlling fluid flow through the openings 101, 102 and 103 of the guide member 38 and the orifices 112 of the flow control part 40 depending on the axial position of the flow control part 40 with respect to the guide member 38. Generally speaking, the flow control part 40 is moved between three different axial positions to change the height of the telescoping seatpost 22. In this embodiment, the flow control part 40 has a first control position (FIG. 11) corresponding to the high seatpost position (FIG. 5), a second control position (FIG. 15) corresponding to the low seatpost position (FIG. 7), and a third control position (FIG. 13) corresponding to the middle seatpost position (FIG. 6). More specifically, when the flow control part 40 is moved axially downward from third control position (FIG. 13) to the first control position (FIG. 11), the high seatpost position is automatically attained due to the compressed air or gas in the gas chamber 60 as seen in FIG. 5. When the flow control part 40 is moved axially upward from the first control position (FIG. 11) to the third control position (FIG. 13), the middle seatpost position is attained by pushing down on the inner tube 30 to force the fluid to flow from the first chamber 46 to the second chamber 48. When the flow control part 40 is moved further axially upward from the third control position (FIG. 13) to the second control position (FIG. 15), the low seatpost position is attained by pushing down on the inner tube 30 to force more of the fluid to flow from the first chamber 46 to the second chamber 48. As mentioned above, the compressed air or gas in the gas chamber 60 provides a driving force for automatically extending the inner tube 30 with respect to the outer tube 32 when the seat position of the telescoping seatpost 22 is changed from a lower position to a higher position.

Still referring to FIGS. 10, 11, 13 and 15, the valve unit 42 will now be discussed in more detail. The valve unit 42 mainly includes a piston 130, a first check valve 131 and a second check valve 132. The piston 130 is basically immovable with respect to the outer tube 32. Specifically, the piston 130, the first check valve 131 and the second check valve 132 are retained on the upper end of the guide member 38 by the piston nut 98 and a snap ring 134. The piston 130 slides with respect to the inner tube 30 when the height of the telescoping seatpost 22 is changed. The outer surface of the piston 130 is provided with at least one O-ring or annular sealing element 136 that contacts the interior surface of the inner tube 30 to isolate the first fluid chamber 46 from the second fluid chamber 48. As the inner tube 30 slides with respect to the piston 130 to change the height of the telescoping seatpost 22, the volumes of the first and second fluid chambers 46 and 48 change due to the fluid flowing through the first and second check valves 131 and 132 as explained below.

Now the structure of the piston 130 will be discussed in greater detail. The piston 130 includes an axial bore 140, a plurality of first passageways 141 and a plurality of second passageways 142 with a plurality of common openings 143.

The upper end of the guide member 38 is disposed in the axial bore 140 of the piston 130. With this arrangement, the first openings 101 of the guide member 38 are disposed below the piston 130 to fluidly communicate with the second fluid chamber 48, the second openings 102 of the guide member 38 are aligned with the common openings 143 of the piston 130 to fluidly communicate with the first and second passageways 141 and 142, and the third openings 103 of the guide member 38 are disposed above the piston 130 to fluidly communicate with the first fluid chamber 46. The flow control part 40 is slidably disposed within the guide member 38, and thus, the flow control part 40 is also slidably disposed within the axial bore 140 of the piston 130 to control the flow of fluid through the piston 130 and the first and second check valves 131 and 132.

As mentioned above, the first passageways 141 fluidly communicate with the axial bore 140 of the piston 130 via the common openings 143 and the first fluid chamber 46. In this way, fluid can flow from the axial bore 140 through the first passageways 141 to the first fluid chamber 46 via the common openings 143 and the first check valve 131 when the flow control part 40 is moved from the third control position to the first control position for attaining the high seatpost position. As mentioned above, the second passageways 142 fluidly communicate the axial bore 140 of the piston 130 with the second fluid chamber 48 via the common openings 143 and the second fluid chamber 48. In this way, fluid can flow from the axial bore 140 through the second passageways 142 to the second fluid chamber 48 via the common openings 143 and the second check valve 132 when the flow control part 40 is moved from the third control position to the second control position for attaining the low seatpost position.

Now the structures of the first and second check valves 13 land 132 will be discussed in greater detail with reference to FIGS. 11, 13 and 15, the. The first check valve 131 is basically formed by a compression spring 150, a valve plate 152, a resilient sealing ring 154 and a collar 156. The spring 150 is disposed between the piston nut 98 and the valve plate 152 to press the sealing ring 154 against the top surface of the piston 130 for closing the first passageways 141. The collar 156 abuts the piston nut 98 and the top surface of the piston 130. The second check valve 132 is basically formed by a compression spring 160, a valve plate 162, a resilient sealing ring 164, a collar 166 and a valve seat 168. The spring 160 is disposed between the valve seat 168 and the valve plate 162 to press the sealing ring 164 against the bottom surface of the piston 130 for closing the second passageways 142. The collar 166 abuts the valve seat 168 and the bottom surface of the piston 130. The snap ring 134 is provided between the bottom surface of the valve seat 168 so that the piston 130 is immobile with respect to the guide member 38, and thus, immobile with respect to the outer tube 32.

In this illustrated embodiment, as seen in FIGS. 11, 12, 13 and 15, the guide member 38 is provided with a sleeve 170 and a rubber cushioning element 172 below the valve seat 168. The sleeve 170 and the rubber cushioning element 172 act as an upper stopper for limiting upward movement of the inner tube 30 with respect to the guide member 38 and the outer tube 32. The guide block 56 contacts the rubber cushioning element 172 when the telescoping seatpost 22 is in the high seatpost position as seen in FIG. 11.

The first check valve 131 is arranged on the upper side of the piston 130, while the second check valve 132 is arranged on the lower side of the piston 130. The first check valve 131 is a one-way valve that is arranged to block fluid flow from the first fluid chamber 46 to the second fluid chamber 48 and permit fluid flow from the second fluid chamber 48 to the first fluid chamber 46. The second check valve 132 is a one-way valve that is arranged to block fluid flow from the second fluid chamber 48 to the first fluid chamber 46 and permit fluid flow from the first fluid chamber 46 to the second fluid chamber 48. Basically, the flow control part 40 is movably arranged with respect to the first and second check valves 131 and 132 such that fluid flows from the second fluid chamber 48 to the first fluid chamber 46 through the first check valve 131 when the flow control part 40 is in the first control position, and such that fluid flows from the first fluid chamber 46 to the second fluid chamber 48 through the second check valve 132 when the flow control part 40 is in the second control position. Accordingly, fluid flows through the first passageways 141 of the piston 130 from the axial bore 140 of the piston 130 to the first fluid chamber 46 when the flow control part 40 is in the first position to attain the high seatpost position. On the other hand, fluid flows through the second passageways 142 of the piston 130 from the axial bore 140 of the piston 130 to the second fluid chamber 48 when the flow control part 40 is in the second position to attain the low seatpost position. When changing from either the high seatpost position or the low seatpost position to the middle seatpost position, the flow control part 40 blocks the fluid from flowing through the first and second check valves 131 and 132. The blocking portion 74 is slidably disposed with respect to the valve unit 42 to selectively block and open a passage of the valve unit 42 such that fluid flow between the first and second fluid chambers 46 and 48 is selectively blocked to attain a middle seatpost position between the high and low seatpost positions.

Referring now to FIGS. 16 to 19, the flow of fluid through the valve unit 42 will now be discussed using these simplified schematic flow diagrams. In FIGS. 16 to 19, selected parts of the telescoping seatpost 22 illustrated in FIGS. 3 to 15 are simplified and diagrammatically illustrated for the sake of simplicity to understand the movements of the inner tube 30 and the flow control part 40 with respect to the guide member 38. Thus, the reference numbers used in FIGS. 16 to 19 correspond to the parts that are functionally equivalent to the corresponding the parts of the telescoping seatpost 22 illustrated in FIGS. 3 to 15. Basically, FIGS. 16 to 19 show the sequence of movements of the inner tube 30 with respect to the guide member 38 and the flow control part 40 for changing the seatpost position in response to movement of the flow control part 40.

Figure 16:
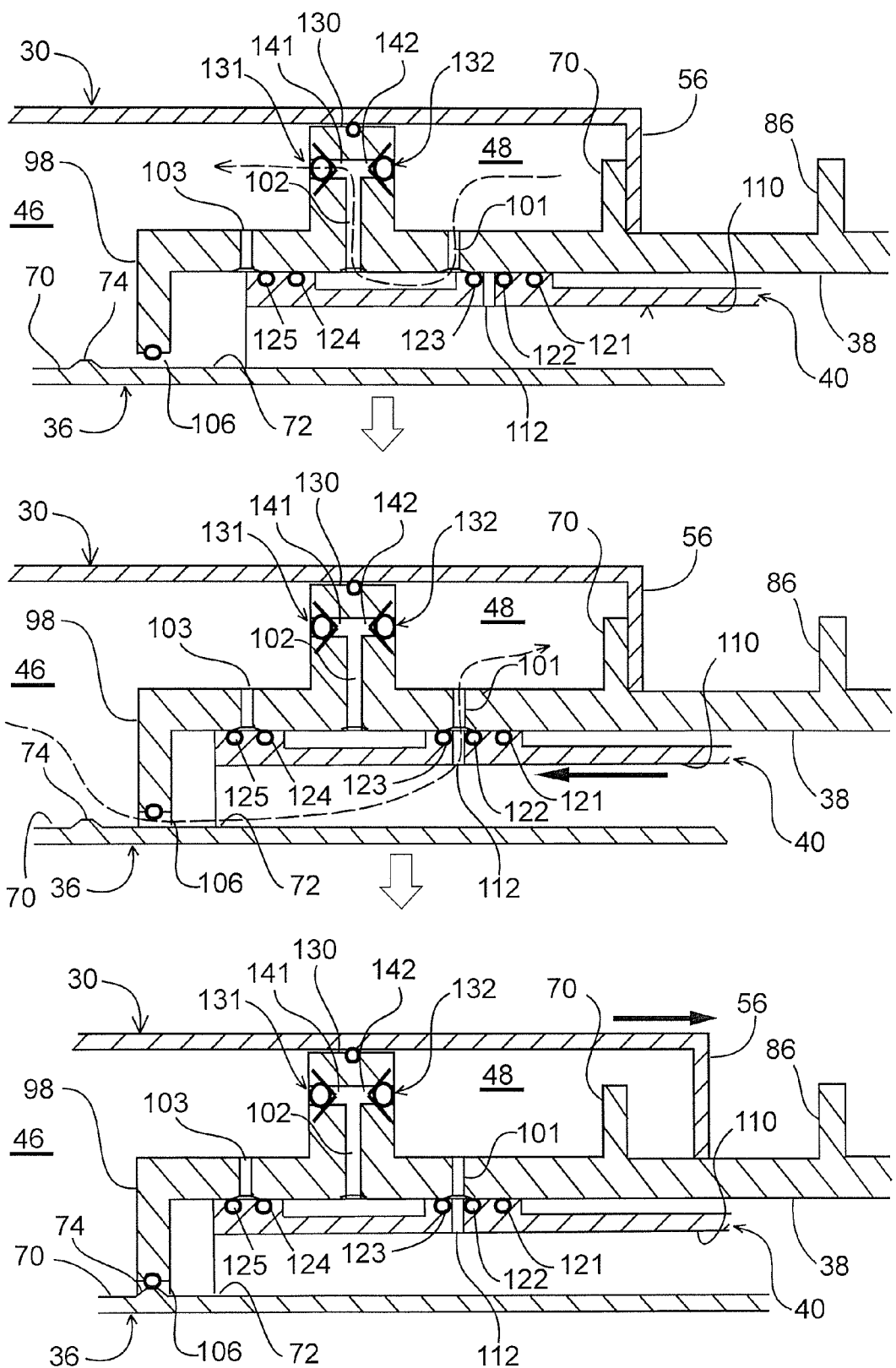
FIG. 16 is a simplified schematic flow diagram of the valve unit showing a sequence of movements of the inner (first) tube and the flow control part with respect to the guide member for changing the seatpost position from the high or top seatpost position to the middle seatpost position in response to movement of the flow control part from the first control position to the third control position.

Referring now to FIG. 16, the height of the telescoping seatpost 22 can be changed from the high seatpost position to the middle seatpost position by moving the flow control part 40 from the first control position (the top diagram of FIG. 16) to the third control position (the bottom diagram of FIG. 16). In the high seatpost position, the flow control part 40 is in the first control position such that the annular space between the sealing members 123 and 124 provides a flow path between the guide member 38 and the flow control part 40 from the first opening 101 of the guide member 38 to the second opening 102 of the guide member 38. Thus, fluid is permitted to flow from the second fluid chamber 48 to the first fluid chamber 46 via the first and second openings 101 and 102 of the guide member 38 and the first check valve 131 in order to attain the high seatpost position.

As seen in the middle diagram of FIG. 16, after the flow control part 40 is moved axially upward (e.g., to the left in FIG. 16) from the first control position to the third control position, the openings 102 of the guide member 38 are isolated by the sealing members 123 and 124 to prevent fluid from flowing through the first and second passageways 141 and 142 and the first and second check valves 13 land 132. Also when the flow control part 40 is moved axially upward (e.g., to the left in FIG. 16) from the first control position to the third control position, the orifices 112 of the flow control part 40 are in fluid communication (e.g., aligned) with the first openings 101 to permit fluid to flow from the first fluid chamber 46 to the second fluid chamber 48 via the opening 106.

As seen in the bottom diagram of FIG. 16, as the inner tube 30 moves down (e.g., to the right in FIG. 16), the rod 36 moves down with the inner tube 30 such that the blocking portion 74 moves into alignment with the opening 106 to block fluid to flow through the opening 106. Thus, initially fluid flows from the first fluid chamber 46 to the second fluid chamber 48 via the opening 106, the orifices 112 and the first openings 101, until the blocking portion 74 of the rod 36 blocks the fluid flowing through the opening 106 of the valve unit 42 in order to attain the middle seatpost position.

Figure 17:
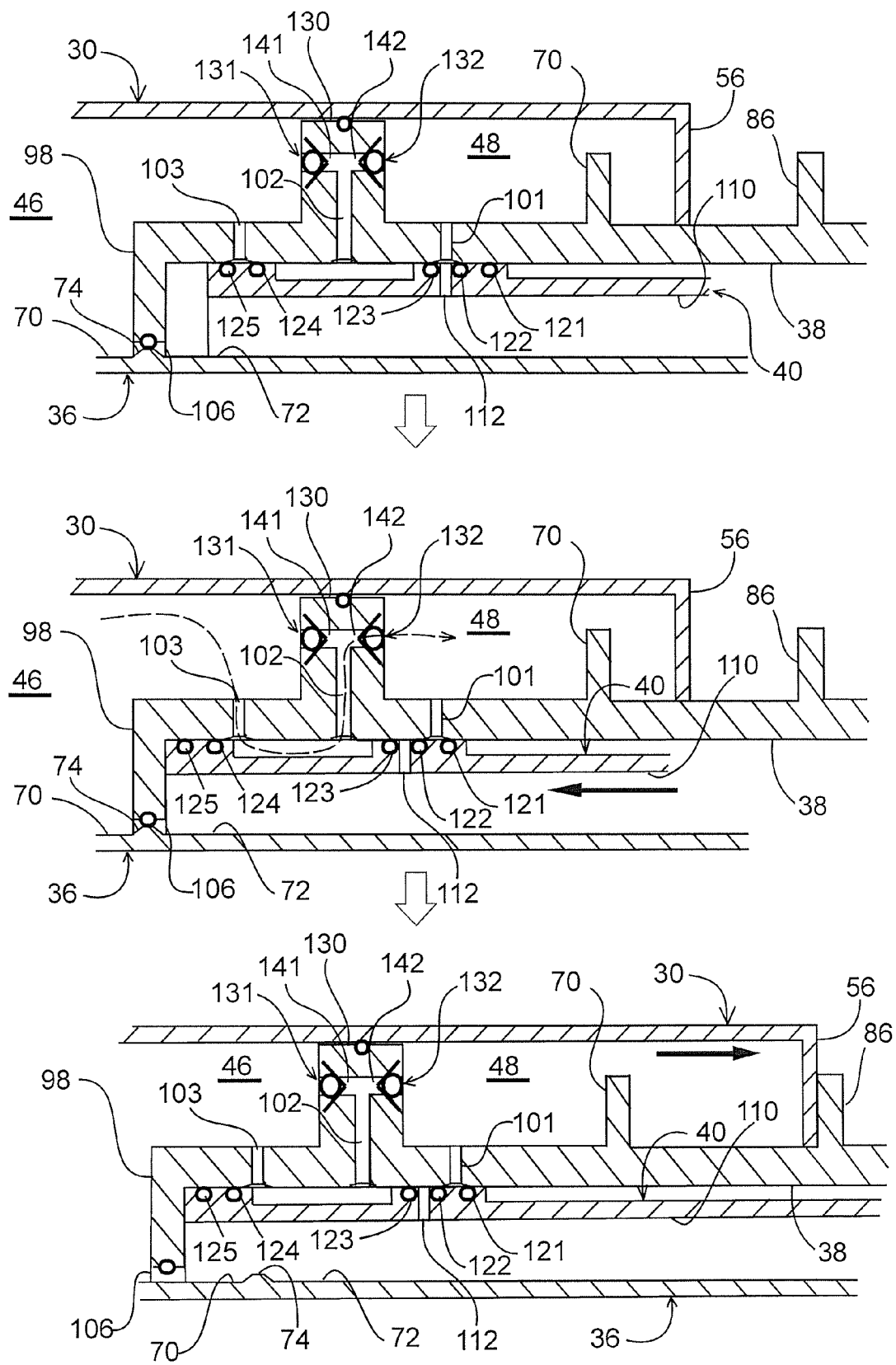
FIG. 17 is a simplified schematic flow diagram of the valve unit showing a sequence of movements of the inner (first) tube and the flow control part with respect to the guide member for changing the seatpost position from the middle seatpost position to the low or bottom seatpost position in response to movement of the flow control part from the third control position to the second control position.

Referring now to FIG. 17, the height of the telescoping seatpost 22 can be changed from the middle seatpost position to the low seatpost position by moving the flow control part 40 from the third control position to the second control position. In the middle seatpost position, the flow control part 40 is in the third control position such that the openings 102 of the guide member 38 are isolated by the sealing members 123 and 124 to prevent fluid from flowing through the first and second passageways 141 and 142 and the first and second check valves 131 and 132. Also the blocking portion 74 is aligned with the opening 106 to block fluid to flow through the opening 106. Thus, in the middle seatpost position, the openings 103 of the guide member 38 are isolated by the sealing members 124 and 125, while the blocking portion 74 of the rod 36 blocks fluid flow through the opening 106 of the valve unit 42 such that the openings 101 of the guide member 38 are isolated from the first fluid chamber 46.

As seen in the middle diagram of FIG. 17, when the flow control part 40 is moved further axially upward (e.g., to the left in FIG. 17) from the third control position to the second control position, the orifices 112 of the flow control part 40 are isolated by the sealing members 121 and 122. Also, in the second control position, the annular space between the sealing members 123 and 124 provides a flow path between the guide member 38 and the flow control part 40 from the second opening 102 of the guide member 38 to the third openings 103 of the guide member 38. Thus, fluid is permitted to flow from the first fluid chamber 46 to the second fluid chamber 48 via the second and third openings 102 and 103 of the guide member 38 and the second check valve 132 in order to attain the low seatpost position.

As seen in the bottom diagram of FIG. 17, as the inner tube 30 moves down (e.g., to the right in FIG. 17), the rod 36 moves down with the inner tube 30 such that the blocking portion 74 moves out of alignment with the opening 106 to permit fluid to flow through the opening 106. Thus, the inner tube 30 moves to the low seatpost position such that the guide block 56 contacts the upper surface of the bottom support part 86 for limiting downward movement of the inner tube 30 with respect to the guide member 38. As mentioned above, preferably, the upper surface of the bottom support part 86 includes at least one rubber cushioning element 89 (not illustrated in FIGS. 16 to 19).

Figure 18:
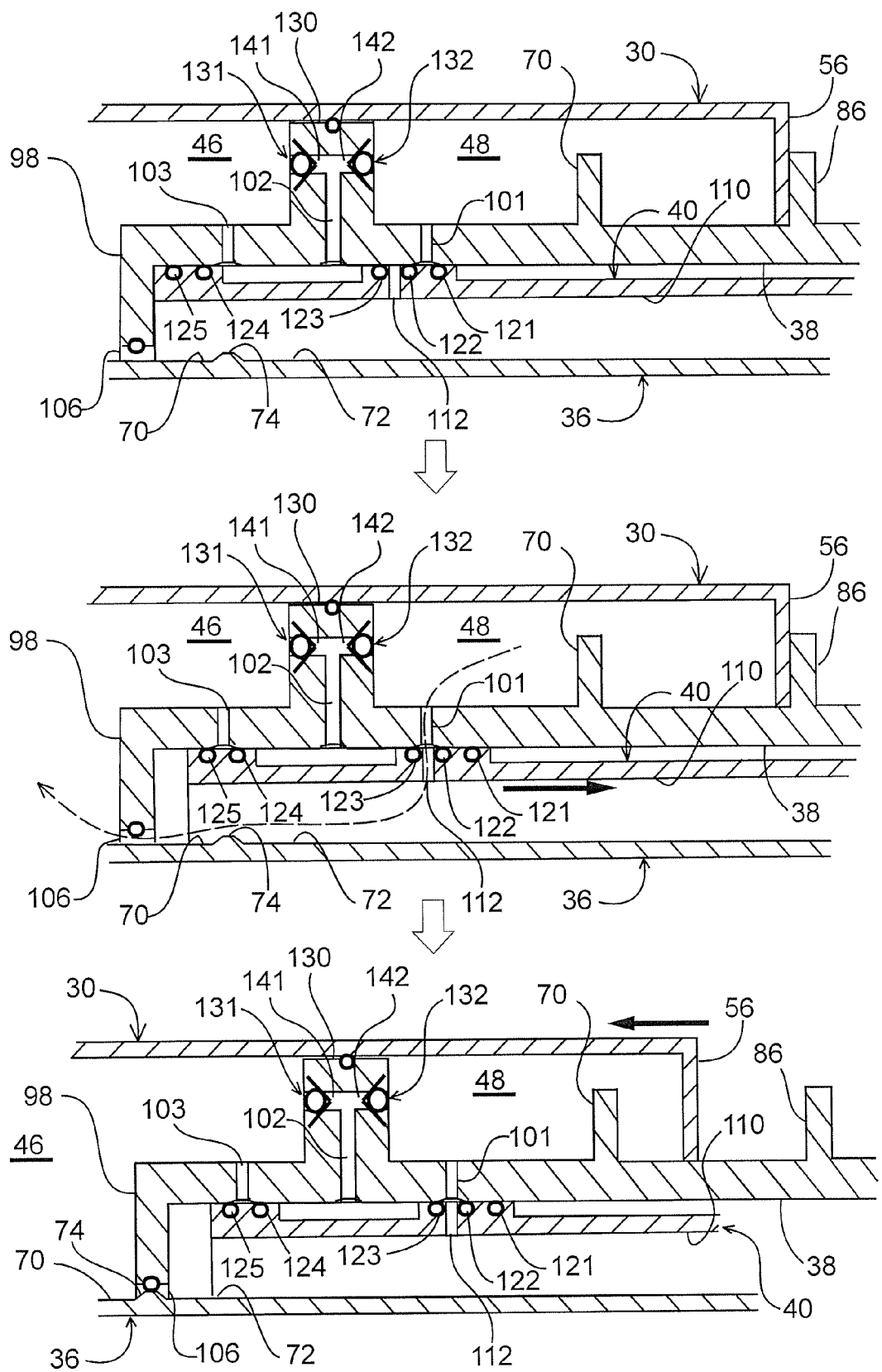
FIG. 18 is a simplified schematic flow diagram of the valve unit showing a sequence of movements of the inner (first) tube and the flow control part with respect to the guide member for changing the seatpost position from the low or bottom seatpost position to the middle seatpost position in response to movement of the flow control part from the second control position to the third control position.

Referring now to FIG. 18, the height of the telescoping seatpost 22 can be changed from the low seatpost position to the middle seatpost position by moving the flow control part 40 from the second control position to the third control position. As mentioned above, in the low seatpost position, the flow control part 40 is in the second control position such that a flow path is established between the first and second fluid chambers 46 and 48 by the annular space between the sealing members 123 and 124 providing a flow path between the guide member 38 and the flow control part 40 from the third openings 103 of the guide member 38 to the second openings 102. Also in the low seatpost position, the first openings 101 of the guide member 38 are isolated by the sealing members 121 and 122, and the orifices 112 are isolated by the sealing members 122 and 123.

As seen in the middle diagram of FIG. 18, after the flow control part 40 is moved axially downward (e.g., to the right in FIG. 18) from the second control position to the third control position, the openings 102 of the guide member 38 are isolated by the sealing members 123 and 124 to prevent fluid from flowing through the first and second passageways 141 and 142 and the first and second check valves 131 and 132. However, this movement of the flow control part 40 from the second control position to the third control position results in the orifices 112 of the flow control part 40 aligning with the first openings 101 of the guide member 38. Thus, with the flow control part 40 is in the third control position, fluid flows from the second fluid chamber 48 to the first fluid chamber 46 via the first openings 101 of the guide member 38, the orifices 112 of the flow control part 40 and the opening 106. As seen in the bottom diagram of FIG. 18, as the inner tube 30 moves up (e.g., to the left in FIG. 18), the rod 36 moves up with the inner tube 30 such that the blocking portion 74 aligns with the opening 106 to block further fluid to flow through the opening 106.

Figure 19:
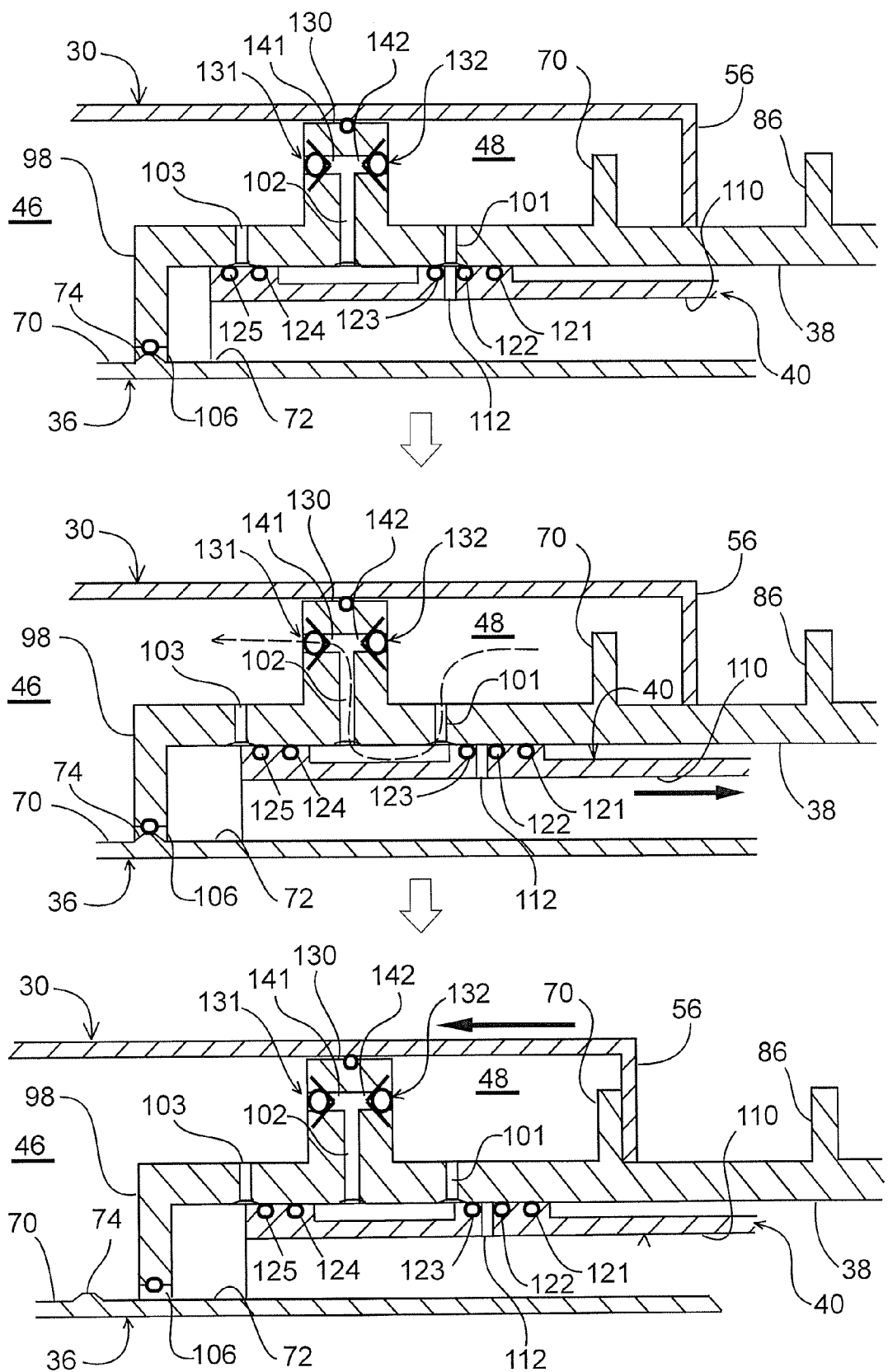
FIG. 19 is a simplified schematic flow diagram of the valve unit showing a sequence of movements of the inner (first) tube and the flow control part with respect to the guide member for changing the seatpost position from the middle seatpost position to the high or top seatpost position in response to movement of the flow control part from the third control position to the first control position.
Figure 20:
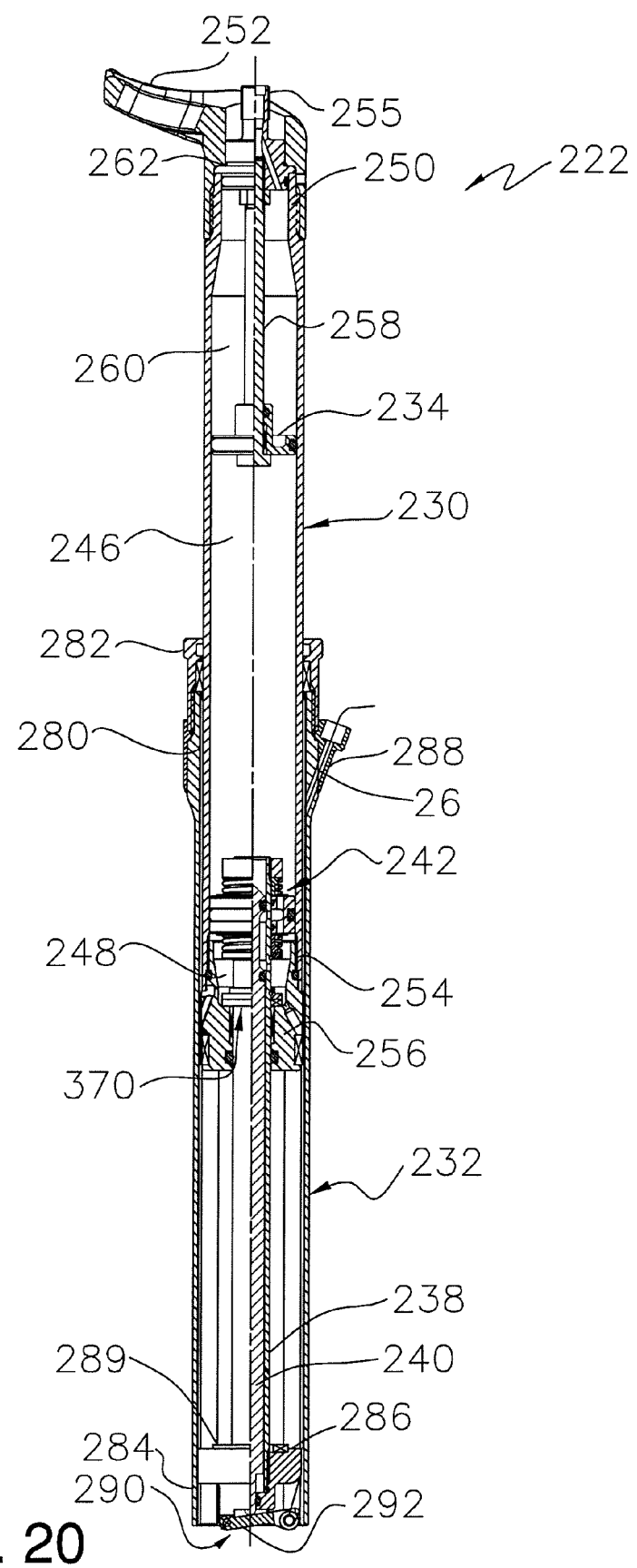
FIG. 20 is a longitudinal cross sectional view of a bicycle seatpost assembly in accordance with a second embodiment, with the bicycle seatpost assembly in the high or top seatpost position and half of selected internal parts shown in elevation.

Referring now to FIG. 19, the height of the telescoping seatpost 22 can be changed from the middle seatpost position to the high seatpost position by moving the flow control part 40 from the third control position to the first control position. In the middle seatpost position, the flow control part 40 is in the third control position such that the openings 102 of the guide member 38 are isolated by the sealing members 123 and 124 to prevent fluid from flowing through the first and second passageways 141 and 142 and the first and second check valves 131 and 132. Also with the flow control part 40 in the third control position, the blocking portion 74 of the rod 36 is aligned with the opening 106 to block the fluid from flowing through the opening 106. Thus, in the middle seatpost position, the openings 103 of the guide member 38 are isolated by the sealing members 124 and 125, while the blocking portion 74 of the rod 36 blocks fluid flow through the center of the valve unit 42 such that the openings 101 of the guide member 38 are isolated from the first fluid chamber 46.

As seen in the middle diagram of FIG. 19, after the flow control part 40 is moved axially downward (e.g., to the right in FIG. 19) from the third control position to the first control position, the annular space between the sealing members 123 and 124 provides a flow path between the guide member 38 and the flow control part 40 from the second opening 102 of the guide member 38 to the first opening 101 of the guide member 38. Thus, fluid is permitted to flow from the second fluid chamber 48 to the first fluid chamber 46 via the first and second openings 101 and 102 of the guide member 38 and the first check valve 131 in order to attain the high seatpost position.

As seen in the bottom diagram of FIG. 19, as the inner tube 30 moves up (e.g., to the left in FIG. 19), the rod 36 moves up with the inner tube 30 such that the blocking portion 74 moves into alignment with the opening 106 to permit fluid to flow through the opening 106. Thus, the inner tube 30 moves to the high seatpost position such that the guide block 56 contacts the rubber cushioning element 172 for limiting upward movement of the inner tube 30 with respect to the guide member 38.

Second Embodiment

Referring now to FIGS. 16 to 30, a telescoping seatpost 222 is illustrated in accordance with a second embodiment. The telescoping seatpost 222 can be used in the seatpost assembly 12 of the first embodiment by replacing the telescoping seatpost 22 with the telescoping seatpost 222. In other words, the operating device 24 and the movement transmission element 26 can be used with the telescoping seatpost 222 in the same manner as discussed above in connection with the telescoping seatpost 22 of the first embodiment. Basically, the telescoping seatpost 222 operates in the same manner as the telescoping seatpost 22 of the first embodiment, except that the middle seatpost position has been eliminated. In view of the similarity between the first and second embodiments, the descriptions of the parts of the second embodiment that are identical in function to the parts of the first embodiment may be omitted for the sake of brevity.

Referring first to FIGS. 16 to 22, the telescoping seatpost 222 is a separate unit from the bicycle frame 16 such that it can be easily installed into the seat tube 14 in place of a conventional non-adjustable seatpost. Basically, the telescoping seatpost 222 includes an inner (first) tube 230, the outer (second) tube 232, a floating piston 234, a guide member 238, a flow control part 240 and a valve unit 242. As mentioned above, the height of the telescoping seatpost 222 is adjustable to two preset seatpost positions. In particular, the inner and outer tubes 230 and 232 are telescopically arranged, with the amount of insertion of the inner tube 230 into the outer tube 232 being adjustable. The outer tube 232 is secured to the seat tube 14 by a conventional clamping arrangement (not shown) provided on the upper end of the seat tube 14.

The inner tube 230 has a first end 250 with a seat mounting member 252 fixed (threaded) thereto and a second end 254 with a guide block 256 fixed (threaded) thereto. The seat mounting member 252 includes an air filler valve port 255 for receiving pressurized air or other gaseous fluid. The air filler valve port 255 includes an air filler valve (not shown), which is a one-way valve for filling the upper end of the inner tube 230 with compressed air. The seat mounting member 252 seals off the first end 250 of the inner tube 230, while the guide block 256 seals of the second end 254 of the inner tube 230. The guide block 256 is slidably supported on the guide member 238 in an air tight manner. Thus, the guide block 256 acts as a bottom plug of the second end 254 of the inner tube 230. Also the guide block 256 acts as an abutment for limiting downward movement of the inner tube 230 with respect to the outer tube 232. While the guide block 256 extends out of the second end 254 of the inner tube 230, alternatively, it is also feasible to recess the guide block 256 from the second end 254 of the inner tube 230 and provide a separate abutment arrangement for limiting downward movement of the inner tube 230 with respect to the outer tube 232.

The first end 250 of the inner tube 230 also includes an axially extending shaft 258, with the floating piston 234 slidably mounted on the shaft 258 to move in an axial direction of the inner tube 230. Thus, the floating piston 234 is disposed in the interior bore of the inner tube 230 and forms a gas chamber 260 disposed between the floating piston 234 and the first end 250 of the inner tube 230 in the same manner as the first embodiment. The axial position of the floating piston 34 changes as the seatpost position of the telescoping seatpost 22 changes.

As seen in FIGS. 16 to 22, the valve unit 242 is immovably disposed with respect to the outer tube 232. The valve unit 242 divides the interior bore of the inner tube 230 into a first or upper fluid chamber 246 and a second or lower fluid chamber 248. The first fluid chamber 246 is disposed between the valve unit 242 and the floating piston 234. The second fluid chamber 248 is disposed between the valve unit 242 and the second end 254 of the inner tube 230. The flow control part 240 cooperates with the guide member 238 and the valve unit 242 to control the flow of fluid between the first and second fluid chambers 246 and 248 to change the height of the telescoping seatpost 222 as explained below.

The upper end of the shaft 258 has an annular flange 262 that is sandwiched between the first end 250 of the inner tube 230 and the seat mounting member 252. The lower end of the shaft 258 has a stopper member 264. The stopper member 264 limits downward movement of the floating piston 234 within the inner tube 230.

The outer tube 232 has a first end 280 with an outer attachment ring 282 fixed (threaded) thereto and a second end 284 with a bottom support part 286 fixed thereto via a bayonet type mount. The first end 280 the outer tube 232 is open such that the second end 254 of the inner tube 230 is telescopically disposed in the first end 280 of the outer tube 232. The outer attachment ring 282 retains an outer cable guide 288 on the external surface of outer tube 232. The outer cable guide 288 guides the movement transmission element 226 through an opening in the side of the outer tube 232. The bottom support part 286 movably supports an actuating device 290 that moves the flow control part 240 in response to movement of the lever 24a of the operating device 24. Preferably, the upper surface of the bottom support part 286 includes at least one rubber cushioning element 289.

As best seen in FIGS. 16 to 22, basically, the actuating device 290 is movably mounted to the second end 284 of the outer tube 232. The actuating device 290 is operatively coupled to the flow control part 240 to selectively move the flow control part 240 in the axial direction of the outer tube 232. The operating device 24 is operatively coupled to the actuating device 290 by the movement transmission element 26 to selectively move the actuating device 290, and thus, move the flow control part 240 to selectively change the height of the telescoping seatpost 222 as explained below.

The actuating device 290 includes a lever 292 that is pivotally mounted at one end to the bottom support part 286. The other end of the lever 292 has the movement transmission element 26 secured thereto. Thus, pulling and releasing the movement transmission element 26 by moving the lever 24a of the operating device 24 causes the lever 292 of the actuating device 290 to pivot about its pivot axis which in turn moves the flow control part 240 within the guide member 238. The coil fluid pressure in the first fluid chamber 246 applies a biasing force on the flow control part 240 in the downward direction.

The lower end of the guide member 238 is fixed (threaded) in a center threaded bore of the bottom support part 286 such that the guide member 238 is coaxially mounted within the outer tube 232. Thus, the guide member 238 is rigidly fixed to the outer tube 232 via the bottom support part 286. The upper end of the guide member 238 is threaded. A piston nut 298 of the valve unit 242 is threaded on the upper end of the guide member 238 to secure the valve unit 242 to the outer tube 232 via the guide member 238 and the bottom support part 286. The piston nut 298 has a center opening or passage 306 that allows the fluid in the first fluid chamber 246 to apply a biasing force to the upper end of the flow control part 240. This passage 306 constitutes a fluid passage of the valve unit 242. The upper end of the guide member 238 is also provided with two sets of radially extending openings 301 and 302. The first radially extending openings 301 are disposed at a first axial position of the guide member 238 from the bottom support part 286. The second radially extending orifices or openings 302 are disposed at a second axial position of the guide member 238 from the bottom support part 286.

Turning now to the flow control part 240 a seen in FIGS. 16 to 22. The flow control part 240 is a solid rod with an annular recess 310. The flow control part 240 has its lower end contacting the lever 292 so that the flow control part 240 moves inside the guide member 238 in an axial direction of the outer tube 232. Thus, the flow control part 240 moves in the axial direction of the outer tube 232 in response to operation of the lever 24a of the operating device 24. The upper end of the flow control part 240 is also provided with a pair of O-rings or annular sealing members 312, with one of the sealing members 312 disposed axially below the annular recess 310 and one of the sealing members 312 disposed axially above the annular recess 310. The orifices or openings 112 fluidly communicate the inner channel 110. In this way, the flow control part 240 can be moved axially to selectively connect the openings 301 and 302 via the annular recess 310 (FIG. 26) or isolate the openings 301 from the openings 302.

Figure 21:
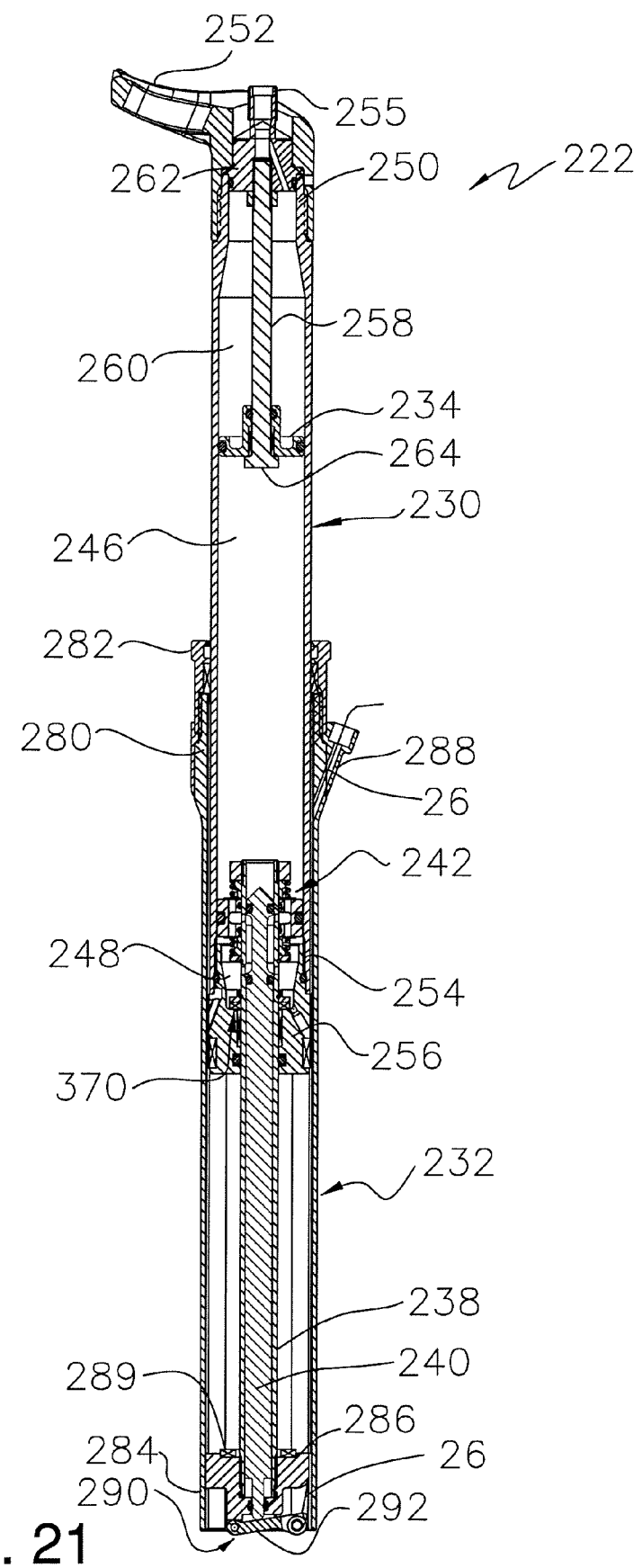
FIG. 21 is a longitudinal cross sectional view of the bicycle seatpost assembly illustrated in FIG. 20, with the bicycle seatpost assembly in the high or top seatpost position.
Figure 22:
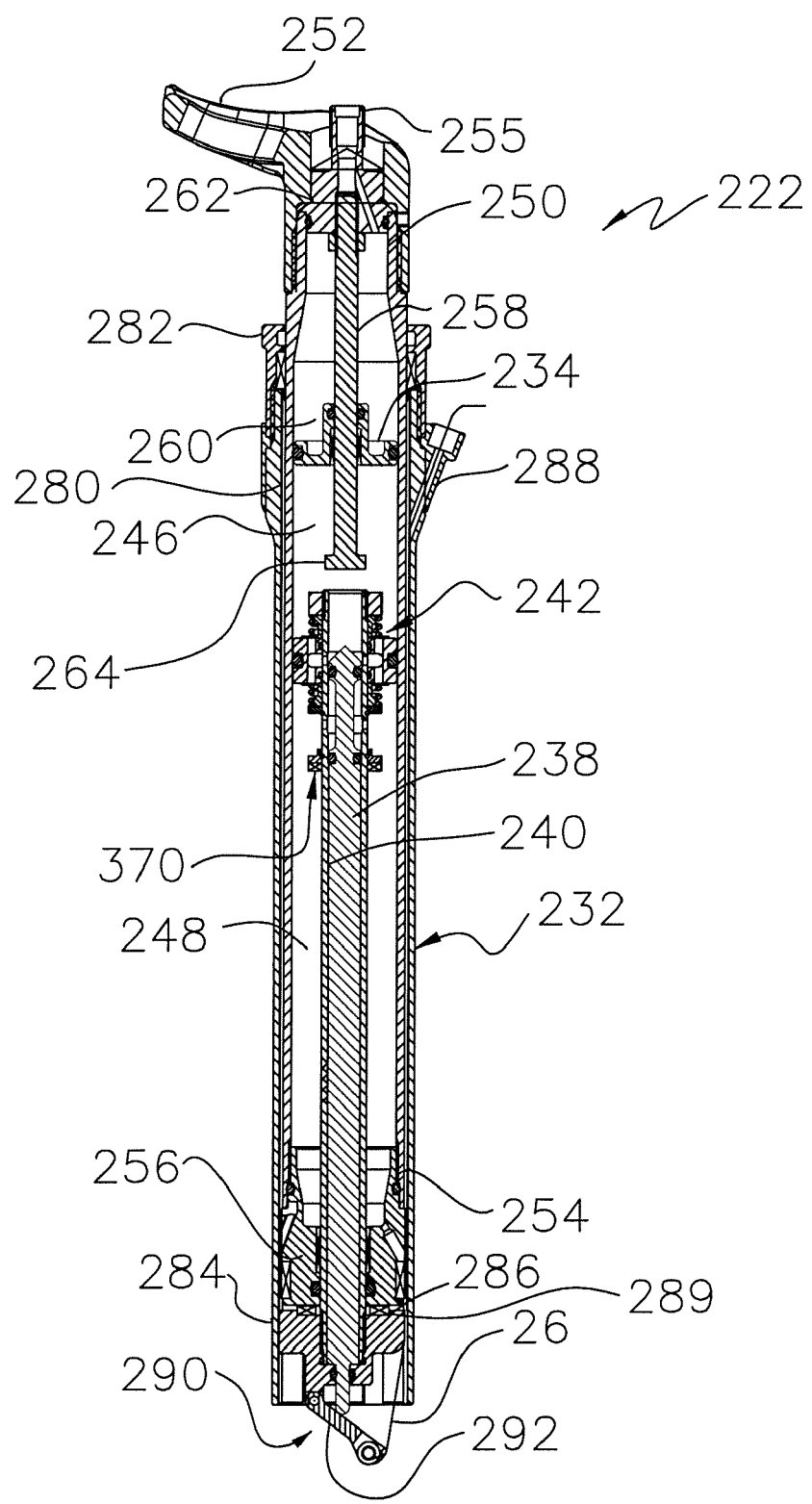
FIG. 22 is a longitudinal cross sectional view of the bicycle seatpost assembly illustrated in FIGS. 20 and 21, with the bicycle seatpost assembly in the low or bottom seatpost position.
Figure 23:
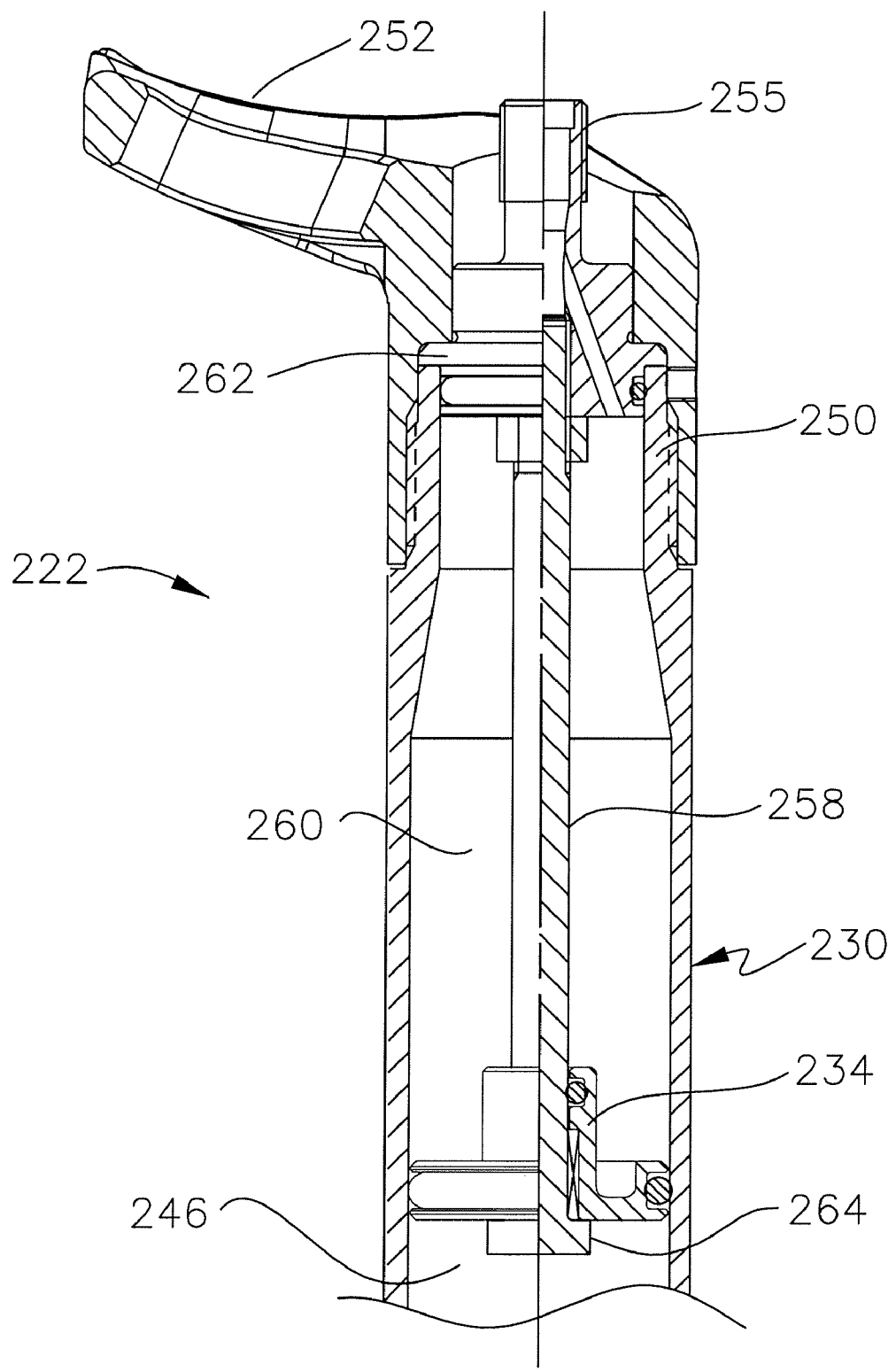
FIG. 23 is an enlarged, longitudinal cross sectional view of a top portion of the bicycle seatpost assembly illustrated in FIG. 21, with the bicycle seatpost assembly in the high or top seatpost position and half of selected internal parts shown in elevation.
Figure 24:
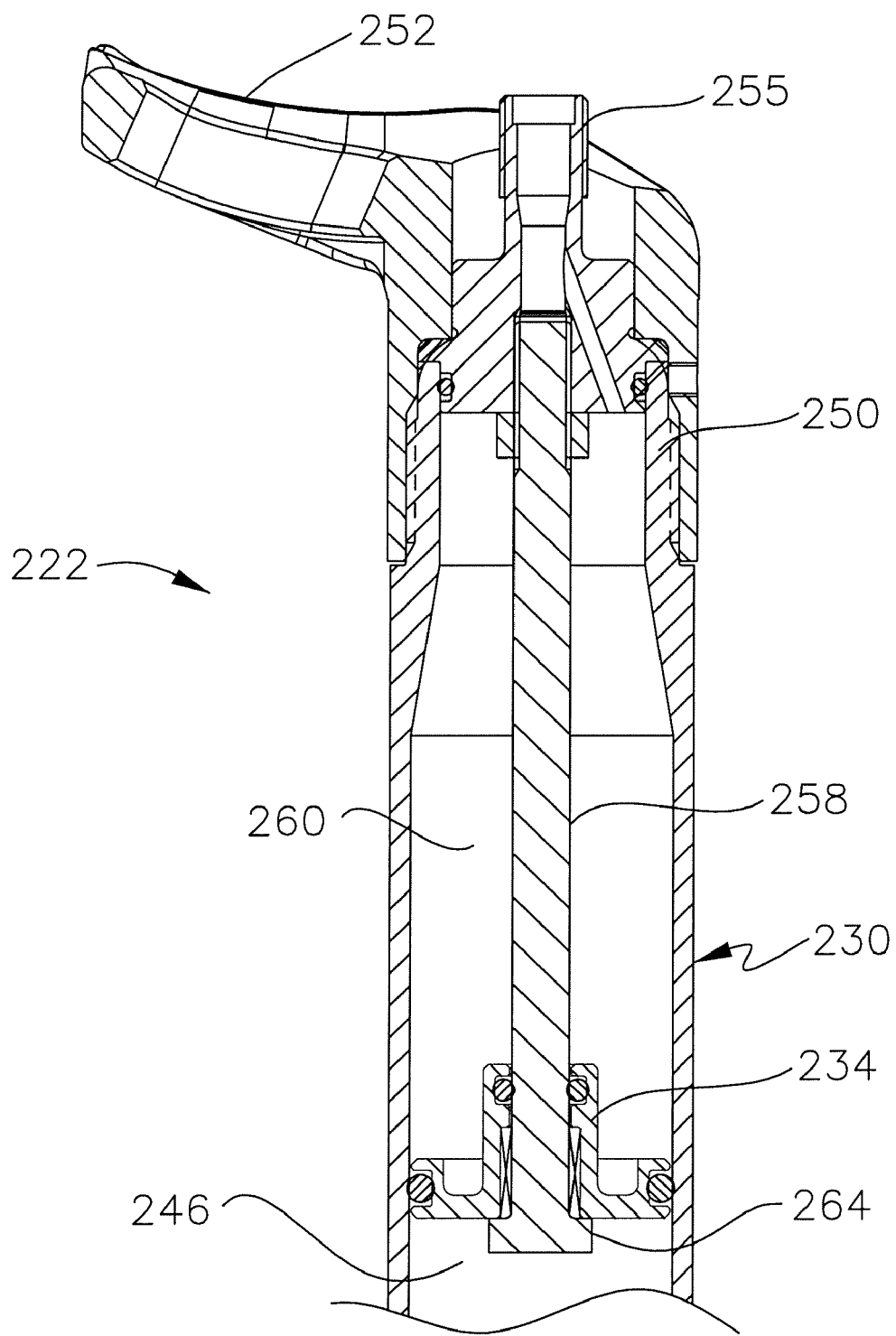
FIG. 24 is an enlarged, longitudinal cross sectional view of a top portion of the bicycle seatpost assembly illustrated in FIG. 21, with the floating piston in the position for attaining the high or top seatpost position of the bicycle seatpost assembly the bicycle seatpost assembly.

In this embodiment, the flow control part 240 has a first control position (FIG. 26) corresponding to the high seatpost position (FIG. 21) and a second control position (FIG. 28) corresponding to the low seatpost position (FIG. 22). More specifically, when the flow control part 240 is held in the first control position (FIG. 26), the high seatpost position is automatically attained due to the compressed air or gas in the gas chamber 260. When the flow control part 240 is moved axially downward from the first control position (FIG. 26) to the second control position (FIG. 22), the low seatpost position is attained by pushing down on the inner tube 230 to force the fluid to flow from the first chamber 246 to the second chamber 248.

Figure 25:
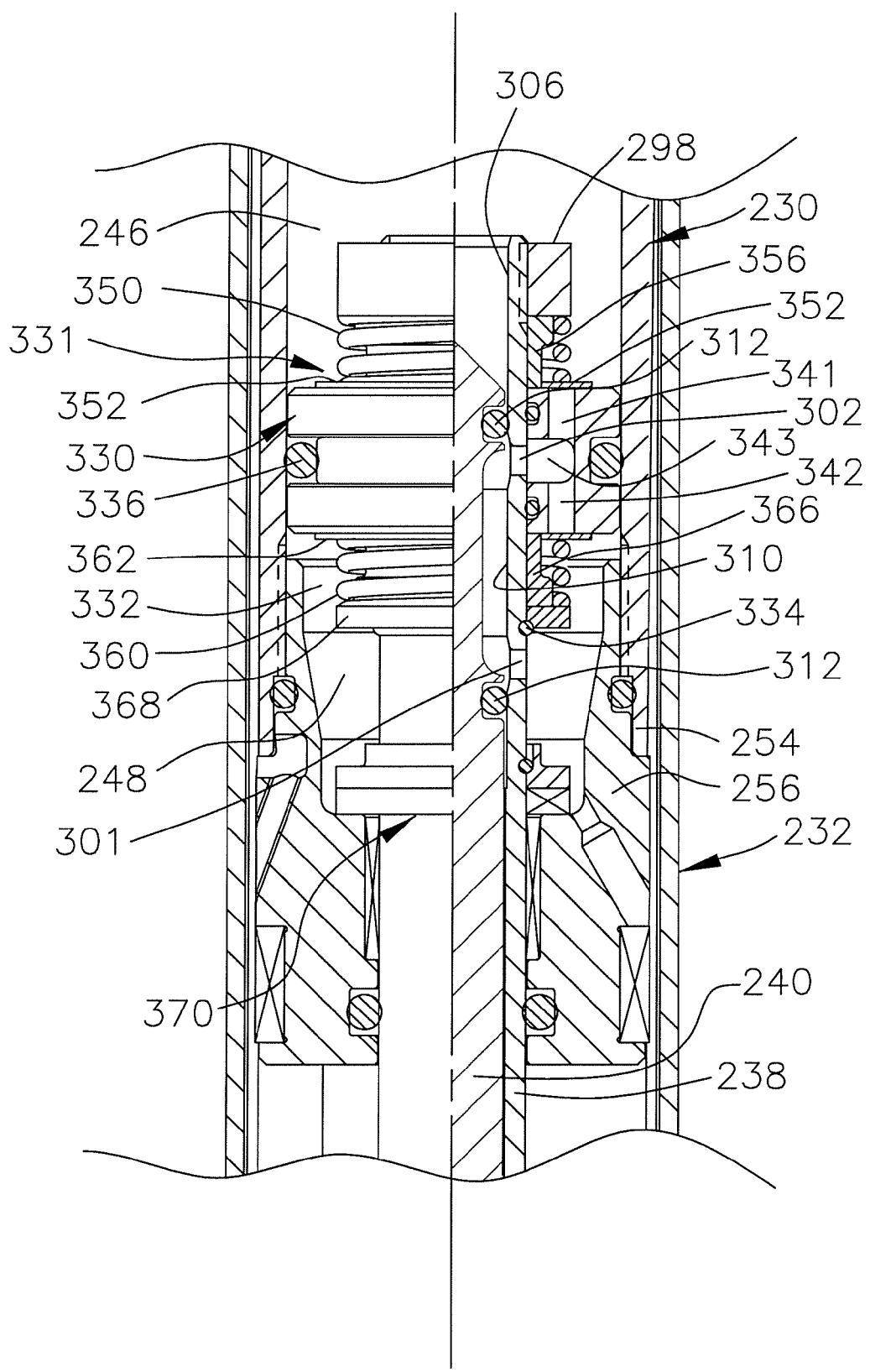
FIG. 25 is an enlarged, longitudinal cross sectional view of a middle portion of the bicycle seatpost assembly illustrated in FIG. 21, with the bicycle seatpost assembly in the high or top seatpost position and half of selected internal parts shown in elevation.
Figure 26:
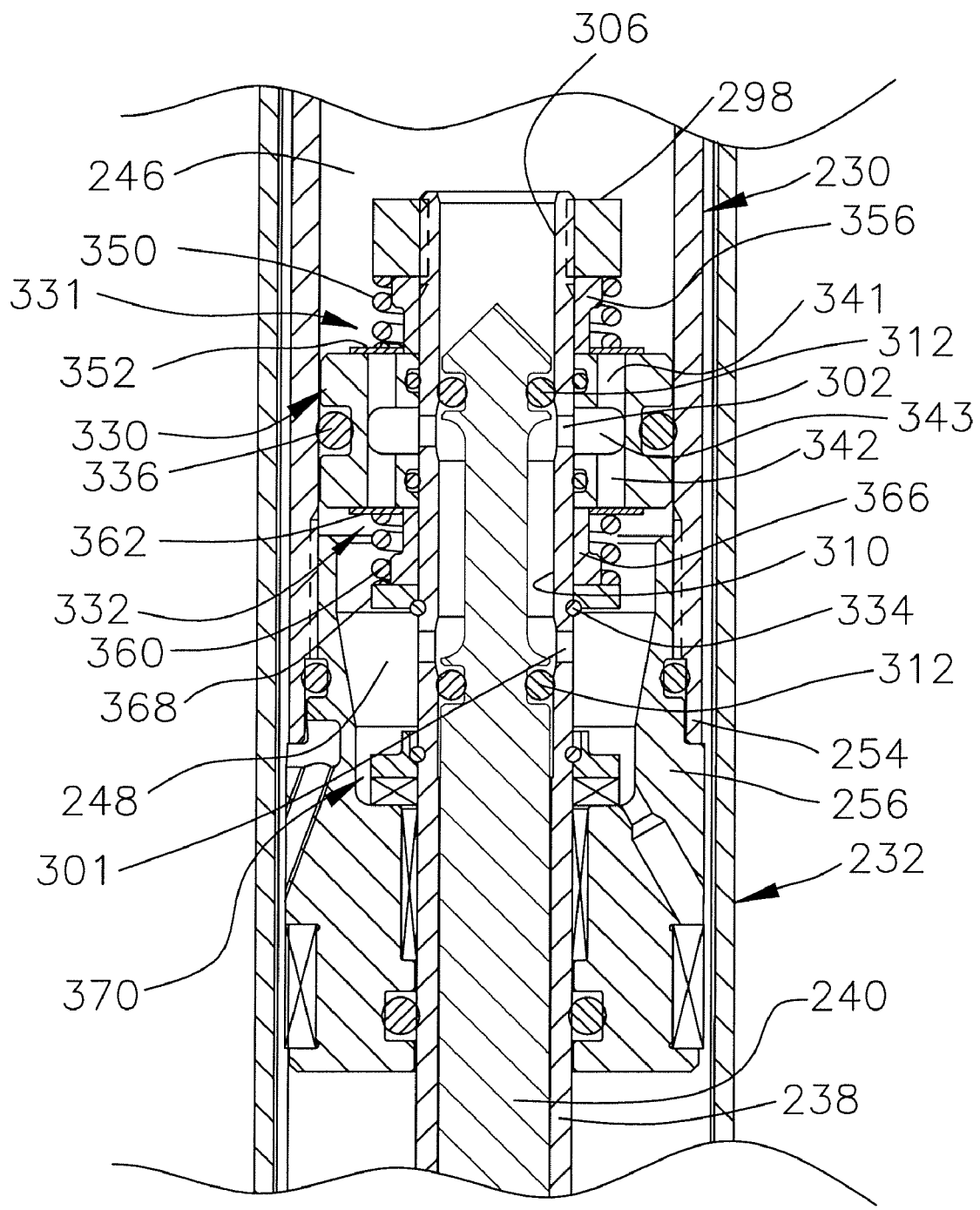
FIG. 26 is an enlarged, longitudinal cross sectional view of a middle portion of the bicycle seatpost assembly illustrated in FIG. 21, with the flow control part in the first control position for attaining the high or top seatpost position of the bicycle seatpost assembly.
Figure 27:
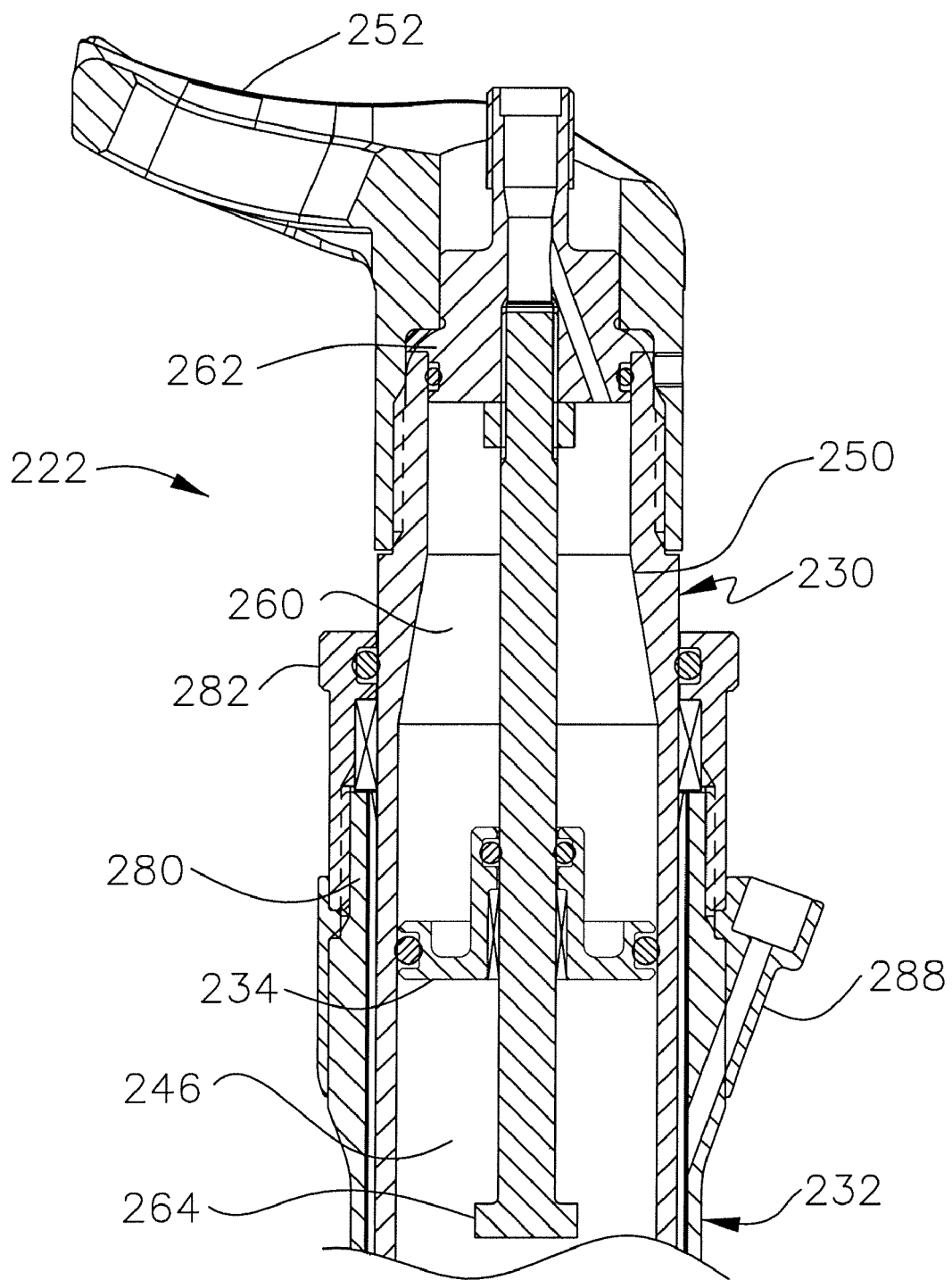
FIG. 27 is an enlarged, longitudinal cross sectional view of a top portion of the bicycle seatpost assembly illustrated in FIG. 22, with the floating piston in the position for attaining the low or bottom seatpost position of the bicycle seatpost assembly.
Figure 28:
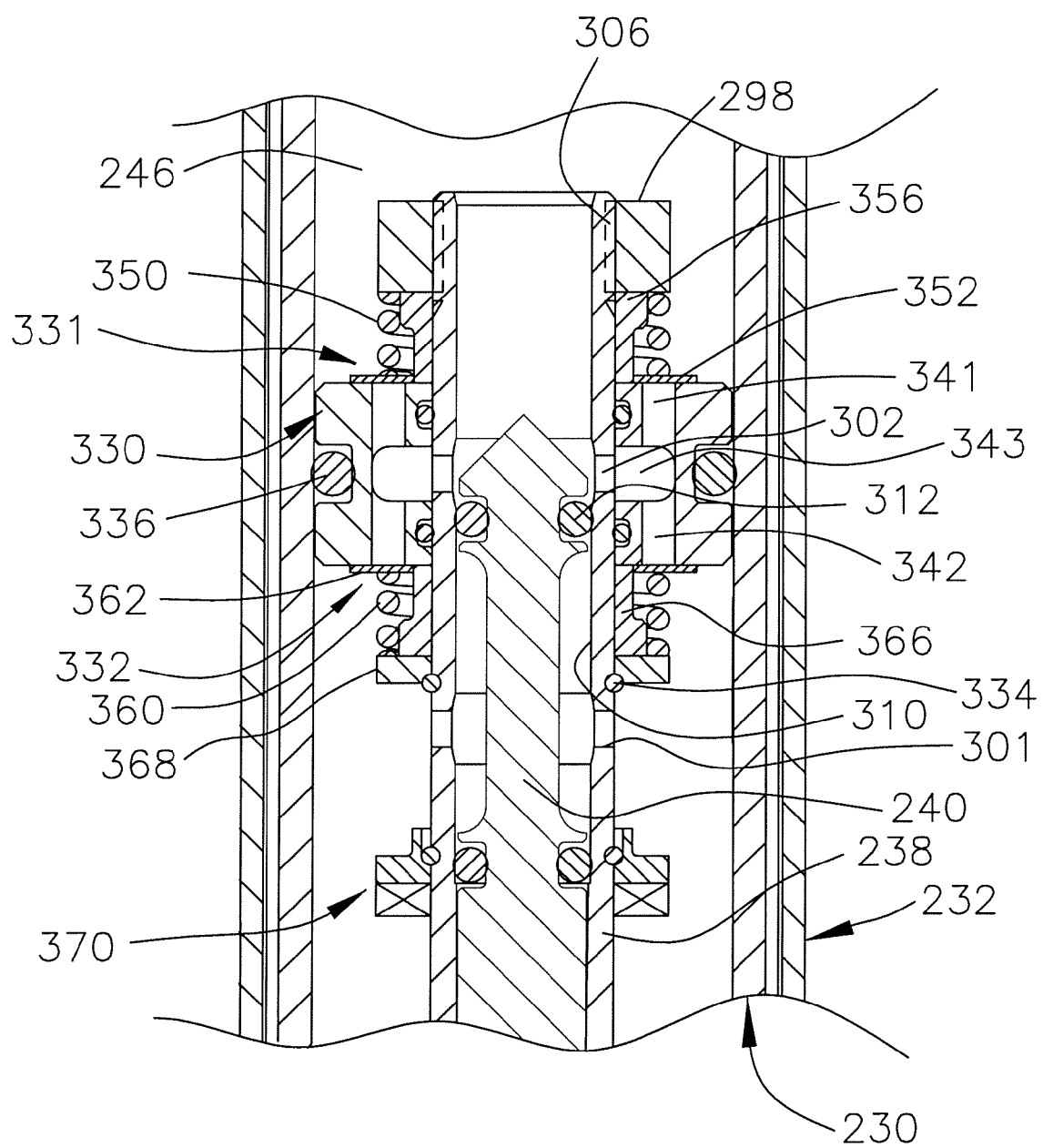
FIG. 28 is an enlarged, longitudinal cross sectional view of a middle portion of the bicycle seatpost assembly illustrated in FIG. 22, with the flow control part in the first control position for attaining the low or bottom seatpost position of the bicycle seatpost assembly.

Referring to FIGS. 25, 26 and 28, the valve unit 242 will now be discussed in more detail. The valve unit 242 mainly includes a piston 330, a first check valve 331 and a second check valve 332. The piston 330 is basically immovable with respect to the outer tube 232. Specifically, the piston 330, the first check valve 331 and the second check valve 332 are retained on the upper end of the guide member 238 by the piston nut 298 and a snap ring 334. The piston 330 slides with respect to the inner tube 230 when the height of the telescoping seatpost 222 is changed. The outer surface of the piston 330 is provided with at least one O-ring or annular sealing element 336 that contacts the interior surface of the inner tube 230 to isolate the first fluid chamber 246 from the second fluid chamber 248. As the inner tube 230 slides with respect to the piston 330 to change the height of the telescoping seatpost 222, the volumes of the first and second fluid chambers 246 and 248 change due to the fluid flowing through the first and second check valves 231 and 232 as explained below.

Now the structure of the piston 230 will be discussed in greater detail. The piston 230 includes an axial bore 340, a plurality of first passageways 341 and a plurality of second passageways 342 with a plurality of common openings 343. The upper end of the guide member 238 is disposed in the axial bore 340 of the piston 330. With this arrangement, the first openings 301 of the guide member 238 are disposed below the piston 330 to fluidly communicate with the second fluid chamber 248, and the second openings 302 of the guide member 238 are aligned with the common openings 343 of the piston 330 to fluidly communicate with the first and second passageways 341 and 342. The flow control part 240 is slidably disposed within the guide member 238, and thus, the flow control part 240 is also slidably disposed within the axial bore 340 of the piston 330 to control the flow of fluid through the piston 330 and the first and second check valves 331 and 332.

As mentioned above, the first passageways 341 fluidly communicate with the axial bore 340 of the piston 330 via the common openings 343 and the first fluid chamber 246. In this way, fluid can flow from the axial bore 340 through the first passageways 341 to the first fluid chamber 246 via the common openings 343 and the first check valve 331 when the flow control part 240 is moved from the first control position to the second control position for attaining the low seatpost position. As mentioned above, the second passageways 342 fluidly communicate the axial bore 340 of the piston 330 with the second fluid chamber 248 via the common openings 343 and the second fluid chamber 248. In this way, fluid can flow from the axial bore 340 through the second passageways 342 to the second fluid chamber 248 via the common openings 343 and the second check valve 332 when the flow control part 240 is moved from the second control position to the first control position for attaining the high seatpost position.

Now the structures of the first and second check valves 331 and 332 will be discussed in greater detail. The first check valve 331 is basically formed by a compression spring 350, a valve plate 352 and a collar 356. The spring 350 is disposed between the piston nut 298 and the valve plate 352 to press the valve plate 352 against the top surface of the piston 330 for closing the first passageways 341. The collar 356 abuts the piston nut 298 and the top surface of the piston 330. The second check valve 332 is basically formed by a compression spring 360, a valve plate 362, a collar 366 and a valve seat 368. The spring 360 is disposed between the valve seat 368 and the valve plate 362 to press the valve plate 362 against the bottom surface of the piston 330 for closing the second passageways 342. The collar 366 abuts the valve seat 368 and the bottom surface of the piston 330. The valve seat 368 sits on the snap ring 334 so that the piston 330 is immobile with respect to the guide member 238, and thus, immobile with respect to the outer tube 232.

The first check valve 331 is arranged on the upper side of the piston 330, while the second check valve 332 is arranged on the lower side of the piston 330. The first check valve 331 is a one-way valve that is arranged to block fluid flow from the first fluid chamber 246 to the second fluid chamber 248 and permit fluid flow from the second fluid chamber 248 to the first fluid chamber 246. The second check valve 332 is a one-way valve that is arranged to block fluid flow from the second fluid chamber 248 to the first fluid chamber 246 and permit fluid flow from the first fluid chamber 246 to the second fluid chamber 248. Basically, the flow control part 240 is movably arranged with respect to the first and second check valves 331 and 332 such that fluid flows from the second fluid chamber 248 to the first fluid chamber 246 through the first check valve 331 when the flow control part 240 is in the first control position, and such that fluid flows from the first fluid chamber 246 to the second fluid chamber 248 through the second check valve 332 when the flow control part 240 is in the second control position. Accordingly, fluid flows through the first passageways 341 of the piston 330 from the axial bore 340 of the piston 330 to the first fluid chamber 246 when the flow control part 240 is in the first position to attain the high seatpost position. On the other hand, fluid flows through the second passageways 342 of the piston 330 from the axial bore 340 of the piston 330 to the second fluid chamber 248 when the flow control part 240 is in the second position to attain the low seatpost position.

In this illustrated embodiment, as seen in FIGS. 25, 26 and 28, the guide member 238 is provided with a cushioning arrangement 370 below the valve seat 368. The cushioning arrangement 370 act as an upper stopper for limiting upward movement of the inner tube 230 with respect to the guide member 238 and the outer tube 232. The guide block 256 contacts the cushioning arrangement 370 when the telescoping seatpost 222 is in the high seatpost position as seen in FIGS. 21 and 26.

Figure 29:
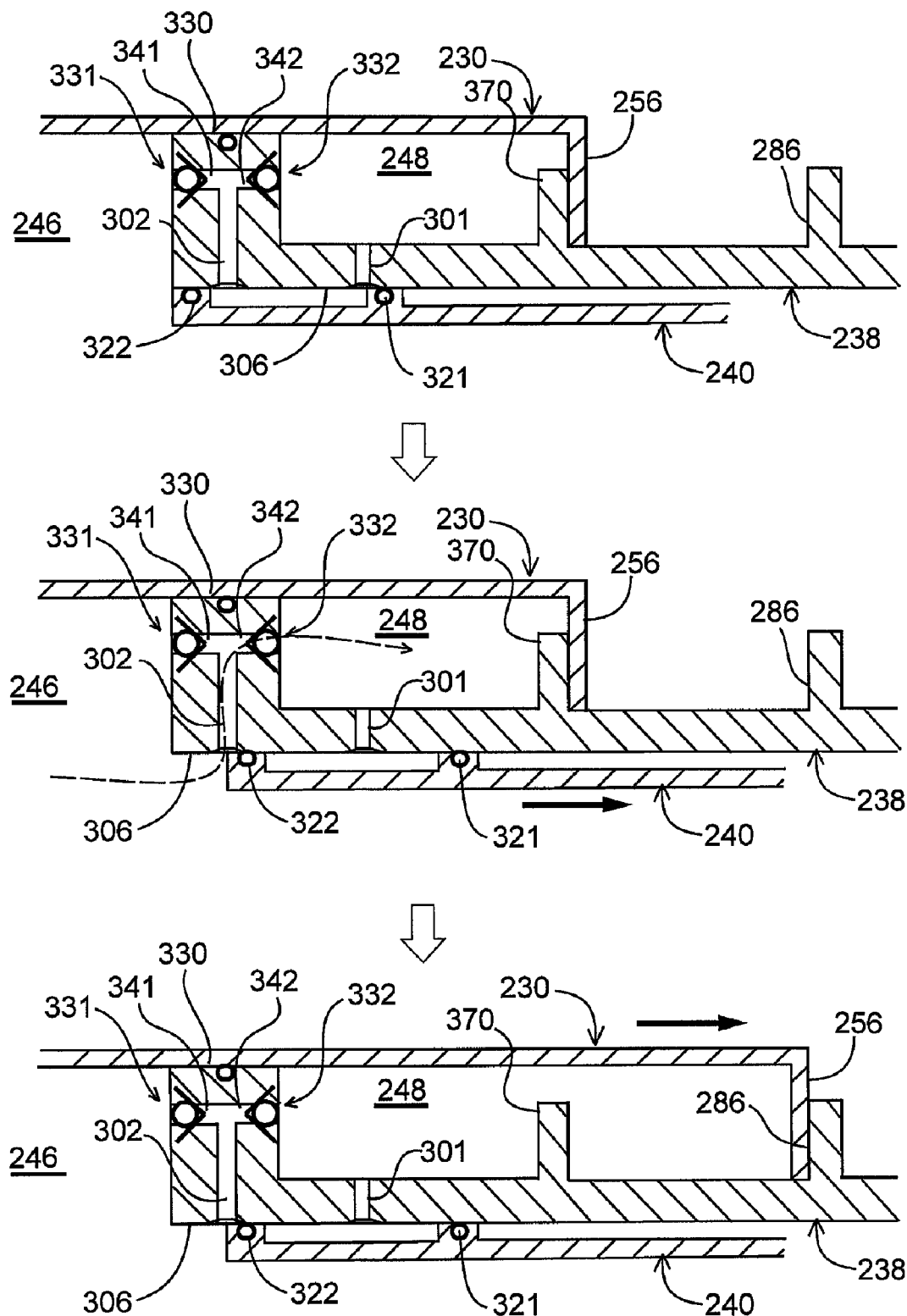
FIG. 29 is a simplified schematic flow diagram of the valve unit showing a sequence of movements of the inner (first) tube and the flow control part with respect to the guide member for changing the seatpost position from the high or top seatpost position to the low or bottom position in response to movement of the flow control part from the first control position to the second control position.

Referring now to FIG. 29, the height of the telescoping seatpost 222 can be changed from the high seatpost position to the low position by moving the flow control part 240 from the first control position to the second control position. In the high seatpost position, as seen in the top diagram of FIG. 29, the flow control part 240 is in the first control position such that annular space between the sealing members 321 and 322 provides a flow path between the guide member 238 and the flow control part 240 from the first opening 301 of the guide member 238 to the second opening 302 of the guide member 238. Thus, fluid is permitted to flow from the second fluid chamber 248 to the first fluid chamber 246 via the first and second openings 301 and 302 of the guide member 238 and the first check valve 331 in order to attain the high seatpost position.

As seen in the middle diagram of FIG. 29, after the flow control part 240 moves down (e.g., to the right in FIG. 29) to the second control position, the flow control part 240 moves below the first openings 301. Thus, fluid can now flow from the first fluid chamber 246 to the second fluid chamber 248 through the second check valve 332 via the opening 302 and the passageways 342 in order to attain the lower seatpost position as seen in the bottom diagram of FIG. 29. As seen in the bottom diagram of FIG. 29, downward movement of the inner tube 230 is limited. In particular, the inner tube 230 moves to the low seatpost position such that the guide block 256 contacts the upper surface of the bottom support part 286 for limiting downward movement of the inner tube 230 with respect to the guide member 238. As mentioned above, preferably, the upper surface of the bottom support part 286 includes at least one rubber cushioning element 289 (not illustrated in FIGS. 29 and 30).

Figure 30:
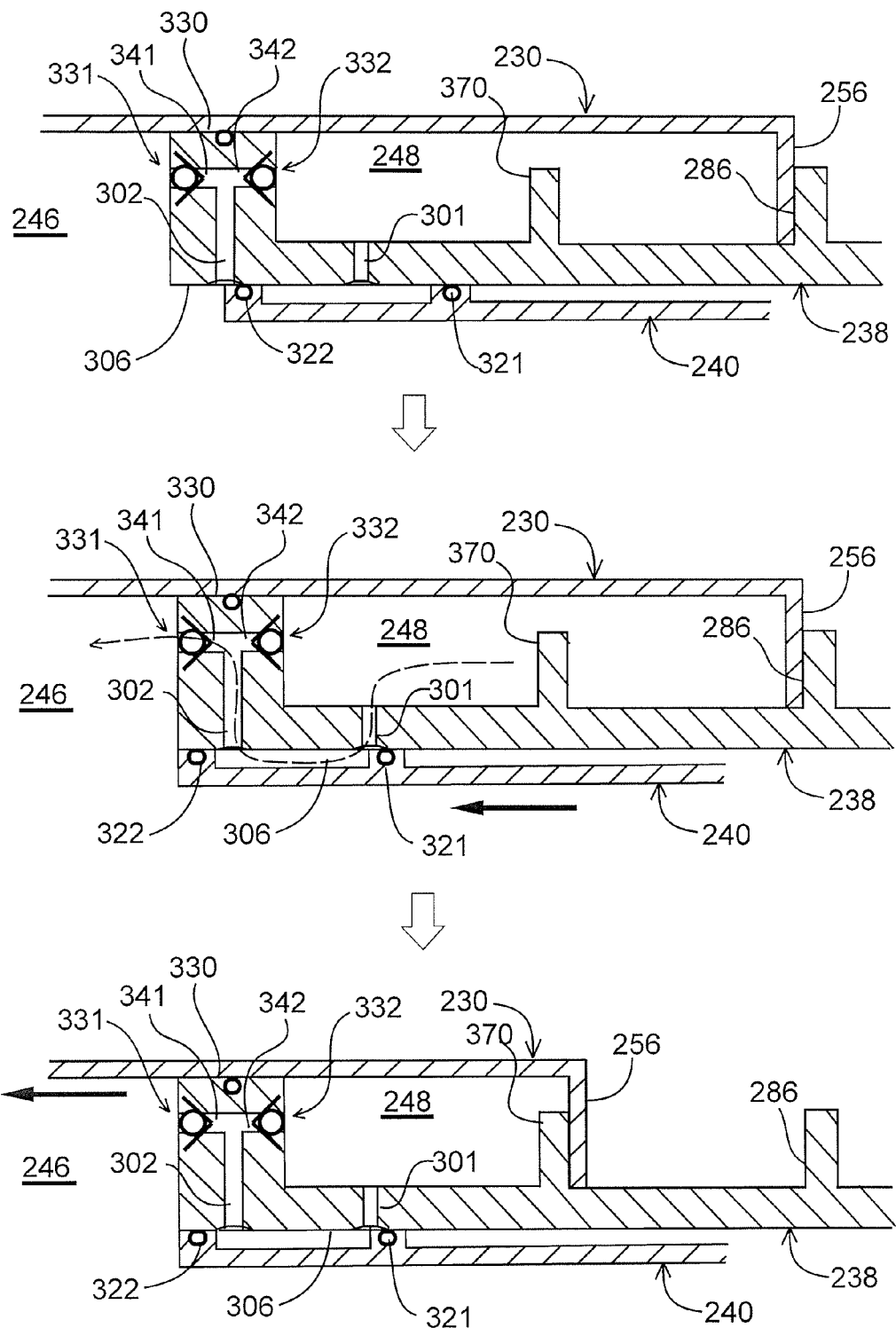
FIG. 30 is a simplified schematic flow diagram of the valve unit showing a sequence of movements of the inner (first) tube and the flow control part with respect to the guide member for changing the seatpost position from the low or bottom seatpost position to the high or top seatpost position in response to movement of the flow control part from the second control position to the first control position.

Referring now to FIG. 30, the height of the telescoping seatpost 222 can be changed from the low seatpost position to the high seatpost position by moving the flow control part 240 from the second control position to the first control position. In the low seatpost position, as seen in the top diagram of FIG. 30, the guide member 238 is disposed below the first openings 301 permitting fluid to flow from the first fluid chamber 246 to the second fluid chamber 248 through the second check valve 332 via the opening 302 and the passageways 342.

As seen in the middle diagram of FIG. 30, after the flow control part 240 moves up (e.g., to the left in FIG. 30) to the first control position, the annular space between the sealing members 321 and 322 provides a flow path between the guide member 238 and the flow control part 240 from the first opening 301 of the guide member 238 to the second opening 302 of the guide member 238. Thus, fluid is permitted to flow from the second fluid chamber 248 to the first fluid chamber 246 via the first and second openings 301 and 302 of the guide member 238 and the first check valve 331 in order to attain the high seatpost position. As seen in the bottom diagram of FIG. 30, upward movement of the inner tube 230 is limited. Thus, the inner tube 230 moves to the high seatpost position such that the guide block 256 contacts the rubber cushioning arrangement 370 for limiting upward movement of the inner tube 230 with respect to the guide member 238.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle seatpost assembly. Accordingly, these terms, as utilized to describe the present invention should be interpreted relative to a bicycle equipped with the bicycle seatpost assembly as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A bicycle seatpost assembly comprising:
a first tube having a first end and a second end;
a second tube having a first end and a second end, with the first end of the second tube being open such that the second end of the first tube being telescopically disposed in the first end of the second tube;
a floating piston disposed in an interior bore of the first tube and forming a gas chamber disposed between the floating piston and the first end of the first tube;
a valve unit immovably disposed with respect to the second tube and dividing the interior bore of the first tube into a first fluid chamber and a second fluid chamber, with the first fluid chamber being disposed between the valve unit and the floating piston, the second fluid chamber being disposed between the valve unit and the second end of the first tube, the valve unit including a first check valve and a second check valve, the first check valve being arranged to block fluid flow from the first fluid chamber to the second fluid chamber and permit fluid flow from the second fluid chamber to the first fluid chamber, the second check valve being arranged to block fluid flow from the second fluid chamber to the first fluid chamber and permit fluid flow from the first fluid chamber to the second fluid chamber; and a flow control part movably arranged with respect to the first and second check valves such that fluid flows from the second fluid chamber to the first fluid chamber through the first check valve when the flow control part is in a first position, and such that fluid flows from the first fluid chamber to the second fluid chamber through the second check valve when the flow control part is in a second position.

2. The bicycle seatpost assembly according to claim 1, further comprising
a guide member fixed to the second tube, with the flow control part being movably mounted inside the guide member to move in an axial direction of the second tube.

3. The bicycle seatpost assembly according to claim 2, wherein
the valve unit is fixed to the guide member.

4. The bicycle seatpost assembly according to claim 1, wherein
the valve unit includes a piston slidably arranged within the first tube, with the flow control part being slidably disposed within an axial bore of the piston.

5. The bicycle seatpost assembly according to claim 4, wherein
the piston includes a first passageway fluidly communicating the axial bore of the piston with the first fluid chamber and a second passageway fluidly communicating the axial bore of the piston with the second fluid chamber,
the first check valve is arranged to block fluid flow through the first passageway of the piston from the first fluid chamber to the axial bore of the piston and permit fluid flow through the first passageway of the piston from the axial bore of the piston to the first fluid chamber when the flow control part is in the first position,
the second check valve is arranged to block fluid flow through the second passageway of the piston from the second fluid chamber to the axial bore of the piston and permit fluid flow through the second passageway of the piston from the axial bore of the piston to the second fluid chamber when the flow control part is in the second position.

6. The bicycle seatpost assembly according to claim 1, further comprising
a rod movably disposed with respect to the valve unit to selectively block and open a passage of the valve unit such that fluid flow between the first and second fluid chambers is blocked to attain a middle seatpost position between a high seatpost position corresponding to the flow control part being in the first position and a low seatpost position corresponding the flow control part being in the second position.

7. The bicycle seatpost assembly according to claim 6, wherein
the valve unit includes a piston slidably arranged within the first tube, with the flow control part being slidably disposed within an axial bore of the piston.

8. The bicycle seatpost assembly according to claim 7, wherein
the piston includes a first passageway fluidly communicating the axial bore of the piston with the first fluid chamber and a second passageway fluidly communicating the axial bore of the piston with the second fluid chamber,
the first check valve is arranged to block fluid flow through the first passageway of the piston from the first fluid chamber to the axial bore of the piston and permit fluid flow through the first passageway of the piston from the axial bore of the piston to the first fluid chamber when the flow control part is in the first position to attain the high seatpost position,
the second check valve is arranged to block fluid flow through the second passageway of the piston from the second fluid chamber to the axial bore of the piston and permit fluid flow through the second passageway of the piston from the axial bore of the piston to the second fluid chamber when the flow control part is in the second position to attain the low seatpost position,
the flow control part is a tubular member that has an inner channel and an opening fluidly communicating the inner channel with the second fluid chamber when the flow control part is in a third position by the rod blocking the passage of the valve unit to block fluid flow between the first and second fluid chambers.

9. The bicycle seatpost assembly according to claim 1, further comprising
an actuating device movably mounted to the second end of the second tube, the actuating device being operatively coupled to the flow control part to selectively move the flow control part in an axial direction of the second tube.

10. The bicycle seatpost assembly according to claim 9, further comprising
an operating device operatively coupled to the actuating device by a movement transmission element to selectively move the actuating device.

11. The bicycle seatpost assembly according to claim 1, wherein
the first end of the first tube includes a seat mounting member.

12. The bicycle seatpost assembly according to claim 1, wherein
the first end of the first tube includes an air filler valve port.

13. The bicycle seatpost assembly according to claim 1, wherein
the first end of the first tube includes an axially extending shaft, with the floating piston slidably mounted on the shaft to move in an axial direction of the first tube.

14. A bicycle seatpost assembly comprising:
a first tube having a first end and a second end;
a second tube having a first end and a second end, with the first end of the second tube being open such that the second end of the first tube being telescopically disposed in the first end of the second tube;
a floating piston disposed in an interior bore of the first tube and forming a gas chamber disposed between the floating piston and the first end of the first tube;
a valve unit dividing the interior bore of the first tube into first and second fluid chambers and regulating fluid flow between the first and second fluid chambers, with the first fluid chamber being disposed between the valve unit and the floating piston, the second fluid chamber disposed between the valve unit and the second end of the first tube;
a flow control part movably arranged with respect to the valve unit such that fluid flows from the second fluid chamber to the first fluid chamber through the valve unit when the flow control part is in a first position, and such that fluid flows from the first fluid chamber to the second fluid chamber through the valve unit when the flow control part is in a second position;
an actuating device movably mounted to the second end of the second tube, the actuating device being operatively coupled to the flow control part to selectively move the flow control part in an axial direction of the second tube; and an operating device operatively coupled to the actuating device by a movement transmission element to selectively move the actuating device.

15. The bicycle seatpost assembly according to claim 14, further comprising
a guide member fixed to the second tube, with the flow control part being movably mounted inside the guide member to move in an axial direction of the second tube.

16. The bicycle seatpost assembly according to claim 15, wherein
the valve unit is fixed to the guide member.

17. The bicycle seatpost assembly according to claim 14, wherein
the valve unit includes a piston slidably arranged within the first tube, with the flow control part being slidably disposed within an axial bore of the piston.

18. The bicycle seatpost assembly according to claim 17, wherein
the piston includes a first passageway fluidly communicating the axial bore of the piston with the first fluid chamber and a second passageway fluidly communicating the axial bore of the piston with the second fluid chamber,
the valve unit including a first check valve and a second check valve, the first check valve is arranged to block fluid flow through the first passageway of the piston from the first fluid chamber to the second fluid chamber via the axial bore of the piston when the flow control part is in the first position, and the first check valve is further arranged to permit fluid flow from the second fluid chamber through the first passageway of the piston from the axial bore of the piston to the first fluid chamber when the flow control part is in the first position,
the second check valve is arranged to block fluid flow through the second passageway of the piston from the second fluid chamber to the first fluid chamber via the axial bore of the piston when the flow control part is in the second position, and the second check valve is further arranged to permit fluid flow from the first fluid chamber through the second passageway of the piston from the axial bore of the piston to the second fluid chamber when the flow control part is in the second position.

19. The bicycle seatpost assembly according to claim 18, further comprising
a rod movably disposed with respect to the valve unit to selectively block and open a passage of the valve unit such that fluid flow between the first and second fluid chambers is blocked to attain a middle seatpost position between a high seatpost position corresponding to the flow control part being in the first position and a low seatpost position corresponding the flow control part being in the second position.

20. The bicycle seatpost assembly according to claim 19, wherein
the valve unit includes a piston slidably arranged within the first tube, with the flow control part being slidably disposed within an axial bore of the piston.

21. The bicycle seatpost assembly according to claim 20, wherein
the piston includes a first passageway fluidly communicating the axial bore of the piston with the first fluid chamber and a second passageway fluidly communicating the axial bore of the piston with the second fluid chamber,
the valve unit including a first check valve and a second check valve, the first check valve is arranged to block fluid flow through the first passageway of the piston from the first fluid chamber to the second fluid chamber via the axial bore of the piston when the flow control part is in the first position, and the first check valve is further arranged to permit fluid flow from the second fluid chamber through the first passageway of the piston from the axial bore of the piston to the first fluid chamber when the flow control part is in the first position,
the second check valve is arranged to block fluid flow through the second passageway of the piston from the second fluid chamber to the first fluid chamber via the axial bore of the piston when the flow control part is in the second position, and the second check valve is further arranged to permit fluid flow from the first fluid chamber through the second passageway of the piston from the axial bore of the piston to the second fluid chamber when the flow control part is in the second position,
the flow control part is a tubular member that has an inner channel and an opening fluidly communicating the inner channel with the second fluid chamber when the flow control part is in a third position by the rod blocking the passage of the valve unit to block fluid flow between the first and second fluid chambers.

22. The bicycle seatpost assembly according to claim 14, wherein
the first end of the first tube includes a seat mounting member.

23. The bicycle seatpost assembly according to claim 14, wherein
the first end of the first tube includes an air filler valve port.

24. The bicycle seatpost assembly according to claim 14, wherein
the first end of the first tube includes an axially extending shaft, with the floating piston slidably mounted on the shaft to move in an axial direction of the first tube.

* * * * *